US011211820B2

(12) United States Patent
Gong et al.

(10) Patent No.: US 11,211,820 B2
(45) Date of Patent: Dec. 28, 2021

(54) WIRELESS POWER TRANSFER AT CHIP SCALE

(71) Applicant: The Board of Trustees of the University of Illinois, Urbana, IL (US)

(72) Inventors: Songbin Gong, Champaign, IL (US); Yansong Yang, Urbana, IL (US); Justin Postma, Twin Falls, ID (US); Liuqing Gao, Champaign, IL (US); Brandon Arakawa, Tempe, AZ (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 440 days.

(21) Appl. No.: 15/979,065

(22) Filed: May 14, 2018

(65) Prior Publication Data
US 2018/0331579 A1 Nov. 15, 2018

Related U.S. Application Data

(60) Provisional application No. 62/506,020, filed on May 15, 2017.

(51) Int. Cl.
| | |
|---|---|
| H02J 50/12 | (2016.01) |
| H02J 50/80 | (2016.01) |
| H02J 50/05 | (2016.01) |
| H02J 50/50 | (2016.01) |

(52) U.S. Cl.
CPC .............. *H02J 50/12* (2016.02); *H02J 50/05* (2016.02); *H02J 50/50* (2016.02); *H02J 50/80* (2016.02)

(58) Field of Classification Search
CPC .. H02J 50/12; H02J 50/50; H02J 50/80; H02J 50/05
See application file for complete search history.

(56) References Cited

U.S. PATENT DOCUMENTS

| | | | | |
|---|---|---|---|---|
| 9,172,436 | B2* | 10/2015 | Miyauchi | ............. H04B 5/0093 |
| 9,281,720 | B2* | 3/2016 | Liu | ......................... H02J 50/12 |
| 9,755,309 | B2* | 9/2017 | Mukherjee | ............... H01Q 7/00 |
| 10,192,160 | B2* | 1/2019 | Loussert | .......... G06K 19/07762 |

(Continued)

OTHER PUBLICATIONS

Mehdi Kiani, et.al., "The Circuit Theory Behind Coupled-Mode Magnetic Resonance-Based Wireless Power Transmission," IEEE Transactions on Circuits and Systems I: Regular Papers, vol. 59, Issue: 9, Sep. 2012, pp. 2065-2074 (Year: 2012).*

(Continued)

*Primary Examiner* — Pinping Sun
(74) *Attorney, Agent, or Firm* — Lowenstein Sandler LLP

(57) ABSTRACT

An inductive wireless power transfer apparatus includes a source coil coupled to a power source such that current flows through the source coil when the source coil is excited by the power source. The apparatus further includes a first capacitor coupled in series to the source coil. The apparatus further includes an intermediate coil surrounding the source coil and positioned within an identical plane as the source coil, and a second capacitor coupled in series to the intermediate coil. The capacitances of the first capacitor and the second capacitor are set to tune out self-inductances of the source coil and the intermediate coil. In embodiments, the source coil is to inductively power the intermediate coil, which is to inductively power a load coil positioned a distance away from the intermediate coil.

22 Claims, 14 Drawing Sheets

(56) References Cited

U.S. PATENT DOCUMENTS

| | | | | |
|---|---|---|---|---|
| 2010/0115474 | A1* | 5/2010 | Takada | H02J 50/12 716/133 |
| 2012/0032632 | A1* | 2/2012 | Soar | H02J 50/70 320/108 |
| 2014/0028112 | A1* | 1/2014 | Hui | H02J 7/025 307/104 |
| 2014/0152118 | A1* | 6/2014 | Kim | H04B 5/0037 307/104 |
| 2015/0341087 | A1* | 11/2015 | Moore | H02J 50/50 455/77 |
| 2016/0006290 | A1* | 1/2016 | Ho | H04B 5/0075 320/108 |
| 2016/0056664 | A1* | 2/2016 | Partovi | B60L 53/122 307/104 |
| 2016/0172104 | A1* | 6/2016 | Mirbozorgi | H02J 50/12 320/108 |

OTHER PUBLICATIONS

B.T. Nukala, et.al., "Efficient near-field inductive wireless power transfer for miniature implanted devices using strongly coupled magnetic resonance at 5.8 GHz," 2016 Texas Symposium on Wireless and Microwave Circuits and Systems (WMCS),Mar. 31-Apr. 1, 2016, pp. 1-4 (Year: 2016).*

Farid Jolani, "Wireless Power Transfer via Magnetic Resonant Coupling," Dalhousie University, pp. 1-94 (Year: 2015).*

Ramrakhyani, "On the Design of Efficient Multi-Coil Telemetry System for Biomedical Implant," IEEE Transactions on Biomedical Circuits and Systems, vol. 7, No. 1, pp. 11-23 (Year: 2013).*

Aliment, F., et al., "A New Contactless Assembly Method for Paper Substrate Antennas and UHF RFID Chips," IEEE Transactions on Microwave Theory and Techniques, vol. 59, No. 3, pp. 627-637, Mar. 2011.

Arakawa, Brandon, et al. "Simultaneous Wireless Power Transfer and Communication to Chip-Scale Devices," IEEE, pp. 311-314, 2017.

Cannon, B.L., et al., "Magnetic Resonant Coupling as a Potential Means for Wireless Power Transfer to Multiple Small Receivers," IEEE Transactions on Power Electronics, vol. 24, No. 7, pp. 1819-1825, Jul. 2009.

Chen, X., et al., "A2.45-GHz Near-Filed RFID System with Passive On-Chip Antenna Tags," IEEE Transactions on Microwave Theory and Techniques, vol. 56, No. 6, pp. 1397-1404, Jun. 2008.

Cheon, S. et al., "Circuit-Model-Based Analysis of a Wireless Energy-Transfer System via Coupled Magnetic Resonances," IEEE Transactions on Industrial Electronics, vol. 58, No. 7, pp. 2906-2914, Jul. 7, 2011.

Gao, L., et al., "Radio Frequency Wireless Power Transfer to Chip-Scale Apparatuses," in Microwave Symposium (IMS), 2016 IEEE MTT-S International, pp. 1-4, 2016.

Garnica, J. et al., "High Efficiency Midrange Wireless Power Transfer System," IMWS-IWPT2011 Proceedings, pp. 73-76, 2011.

Garnica, J. et al., "Wireless Power Transmission: From Far Field to Near Field," Proceedings of the IEEE, vol. 101, No. 6, pp. 1321-1331, Jun. 6, 2013.

Kiani, M. et al., "Design and Optimization of a 3-Coil Inductive Link for Efficient Wireless Power Transmission," IEEE Transactions on Biomedical Circuits and Systems, vol. 5, No. 6, pp. 579-591, Dec. 2011.

Kiani, M., et al., "The Circuit Theory Behind Coupled-Mode Magnetic Resonance-Based Wireless Power Transmission," IEEE Transactions on Circuits and Systems I: Regular Papers, vol. 59, No. 9, pp. 2065-2074, Sep. 2012.

Kim, J. et al., "Efficiency Analysis of Magnetic Resonance Wireless Power Transfer with Intermediate Resonant Coil," IEEE Antennas and Wireless Propagation Letters, vol. 10, pp. 389-392, 2011.

Krikidis, I., et al., "Simultaneous Wireless Information and Power Transfer in Modern Communication Systems," IEEE Communications Magazine, vol. 52, No. 11, pp. 104-110, Nov. 2014.

Kuo, N.-C., et al., "Near-Field Power Transfer and Backscattering Communication to Miniature RFID Tage in 65 nm CMOS Technology," in Mircowave Symposium (IMS), 2016 IEEE MTT -S International, pp. 1-4, 2016.

Kurs, A. et al., "Wireless Power Transfer via Strongly Coupled Magnetic Resonances," Science, vol. 317, pp. 83-86, Jul. 6, 2007, downloaded from http://science.sciencemag.org/, on May 25, 2018.

Lee, C.K., et al. "Recent Progress in Mid-Range Wireless Power Transfer," 2012 IEEE Energy Conversion Congress and Exposition (ECCE), pp. 3819-3824, 2012.

Lee, S., et al., "Wireless Body Area Networks: Where Does Energy Go?," 2012 IEEE International Symposium on Workload Characterization (IISWC), pp. 25-35, 2012.

Nintanavongsa, P. et al., "Design Optimization and Implementation for RF Energy Harvesting Circuits," IEEE, Journal on Emerging and Selected Topics in Circuits and System, vol. 2, No. 1, pp. 24-33, Mar. 2012.

Paing, T., et al. "Wirelessly-Powered Wireless Sensor Platform," Wireless Technologies, European Conference, pp. 241-244, 2007.

Usami, M., "An Ultra-Small RFID Chip: μ-Chip," Proceedings of 2004 IEEE Asia-Pacific Conference on Advanced System Integrated Circuits (AP-ASIC2004), pp. 2-5, Aug. 4-5, 2004.

* cited by examiner

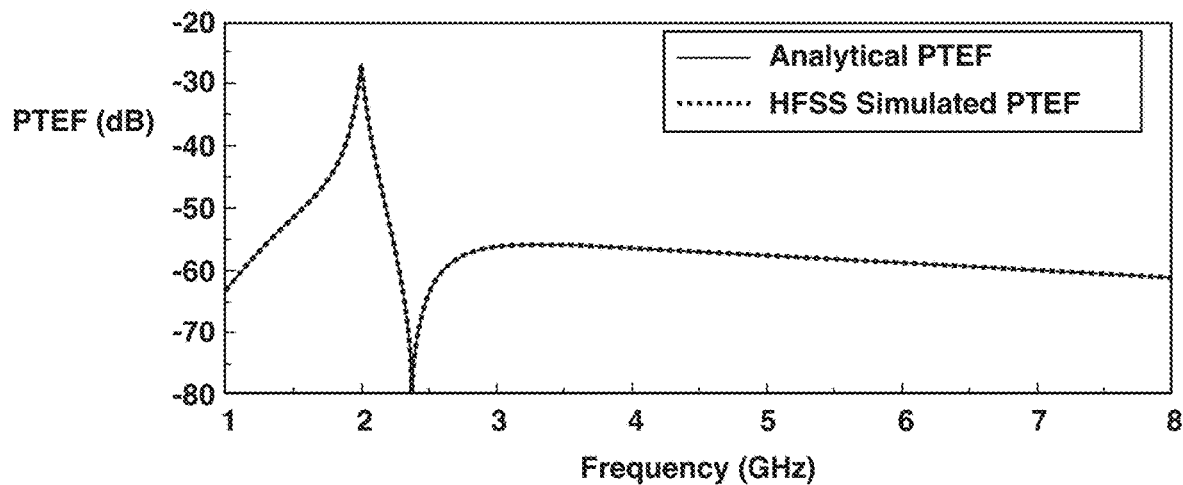
FIG. 8
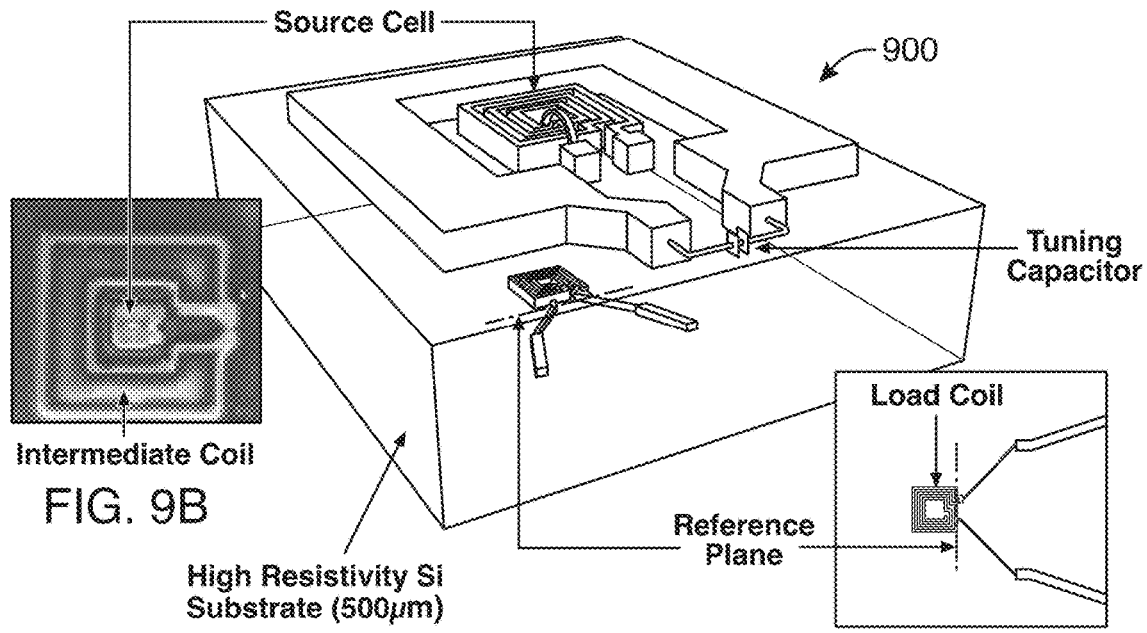
FIG. 9B
FIG. 9A
FIG. 9C
1. Electroplating Probe Coils with KMPR as Mold
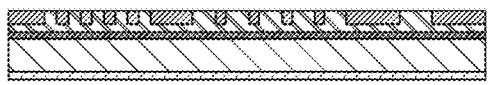
2. KOH Based Etch to Create TSVs
3. Electroplating the Load Coil and TSVs
4. Establish the Bridges for Connection to Probing Pads
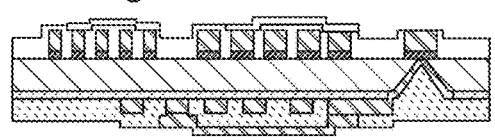
☐Si ☐Au ■Cr ☐PR ☐SiNx ☐BCB
FIG. 9D

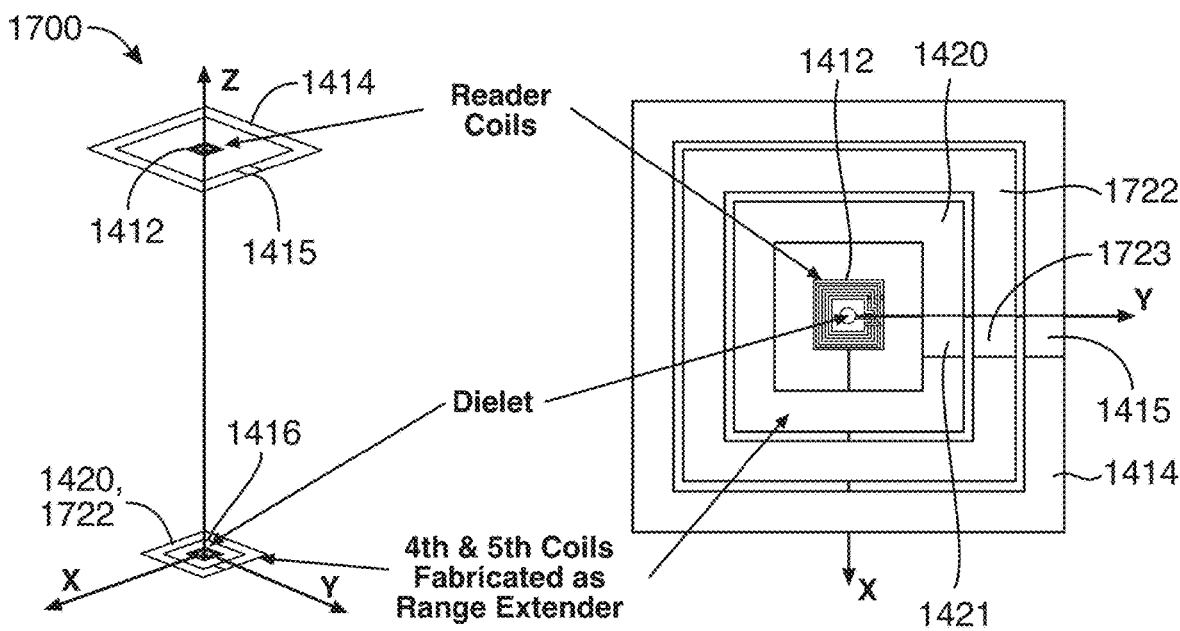
FIG. 17A
FIG. 17B
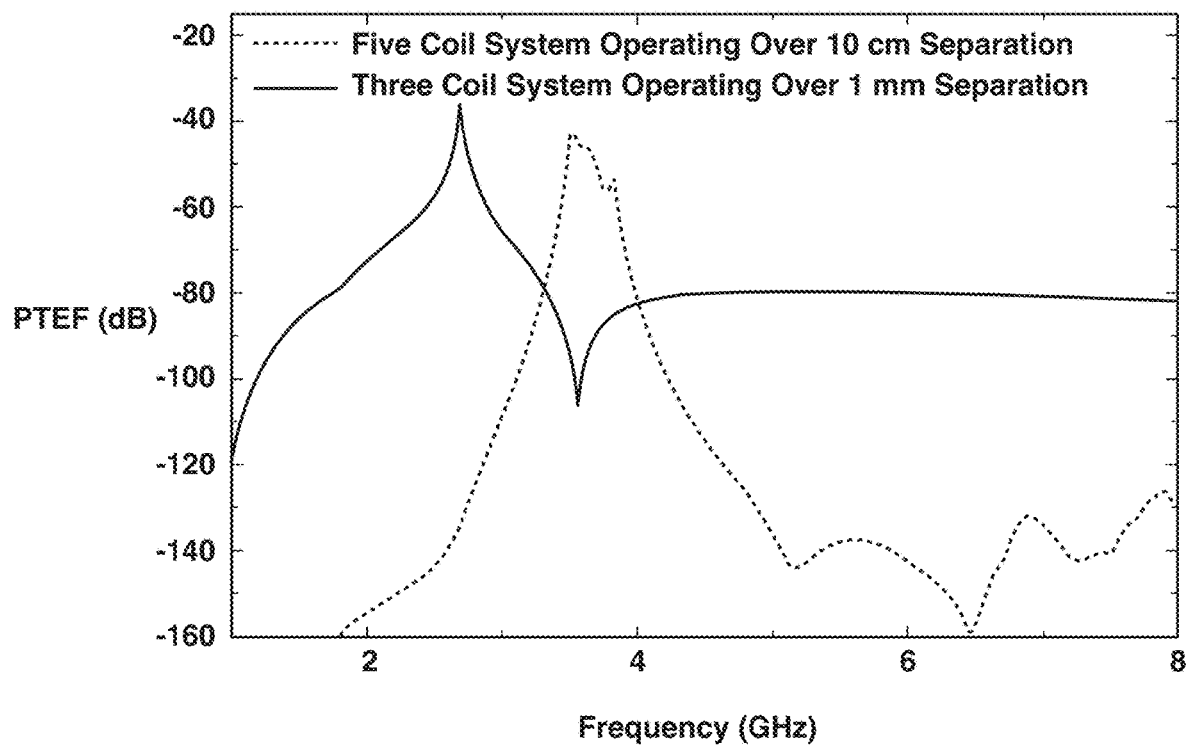
FIG. 18

WIRELESS POWER TRANSFER AT CHIP SCALE

REFERENCE TO EARLIER FILED APPLICATION

This application claims the benefit under 35 U.S.C. § 119(e) of U.S. Provisional Patent Application No. 62/506,020, filed May 15, 2017, which is incorporated herein, in its entirety, by this reference.

FEDERALLY SPONSORED RESEARCH OR DEVELOPMENT

This disclosure was made with government support under HR0011-15-C-0008 awarded by the Defense Advanced Research Projects Agency (DARPA). The government has certain rights in the invention.

BACKGROUND

An inductive wireless power system is particularly appealing for secured short-range operation, considering its non-contacting and non-radiative nature. However, one of the major challenges of inductively and wirelessly powering chip-scale apparatuses stems from the miniature size of chip-scale apparatus. The effective range of power transfer or communication is limited by the size of the coil that resides on the implanted chip or the hardware root of trust. For a distance exceeding five diameters of the coils, the power transfer efficacy diminishes to practically nothing even with high Q coils and magnetic resonance enhanced designs.

BRIEF DESCRIPTION OF THE DRAWINGS

A more particular description of the disclosure briefly described above will be rendered by reference to the appended drawings. Understanding that these drawings only provide information concerning typical embodiments and are not therefore to be considered limiting of its scope, the disclosure will be described and explained with additional specificity and detail through the use of the accompanying drawings.

FIG. 8 is a graph of a comparison between analytical and a high frequency structure simulator (HFSS) simulated PTEF according to an embodiment.

FIG. 9A is a perspective view of an experimental testbed for testing coil-based power transfer systems according to an embodiment.

FIGS. 9B, 9C, and 9D are, respectively, a) a scanning electron microscope (SEM) image of a fabricated power transfer coil, b) an optical image of a fabricated dielet coil, and c) a method to fabricate the power transfer coils according to an embodiment.

FIG. 17A is a perspective view of a five-coil power transfer system according to an embodiment.

FIG. 17B is a top view of the five-coil power transfer system of FIG. 17A according to an embodiment.

FIG. 18 is a graph illustrating the PTEF of the five-coil power transfer system operating over 10 cm separation in comparison to that of a three-coil power transfer system operating over a 1 mm separation at perfect alignment according to an embodiment.

DETAILED DESCRIPTION

Figure 1A:
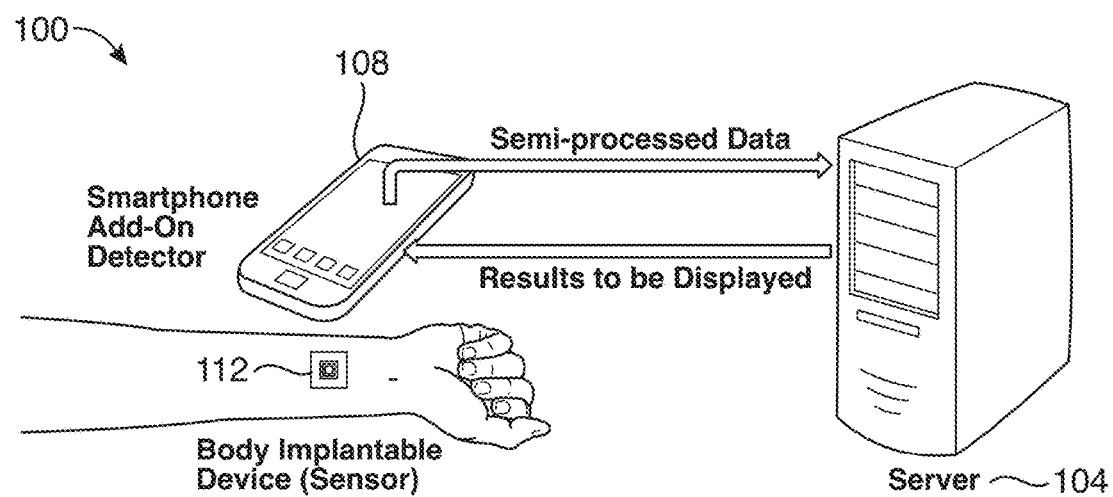
FIG. 1A is a diagram of an example of a wireless body area network system according to an embodiment.

By way of introduction, the present disclosure relates to various embodiments of apparatuses, and related method of manufacture, for inductive wireless charging and communication between two systems of significantly different sizes. Radio frequency (RF) systems that can wirelessly charge and communicate to miniature and chip-scale devices may be desired for several emerging applications, including bio-implantable devices for wireless body networks and hardware roots of trust, which may be embedded in packages of electronic components.

In one embodiment, an inductive wireless power transfer apparatus includes a source coil coupled to a power source such that current flows through the source coil when the source coil is excited by the power source. The apparatus may further include a first capacitor coupled in series to the source coil. The apparatus may further include an intermediate coil surrounding the source coil and positioned within an identical plane (e.g., a first plane) as the source coil. The intermediate coil may be coupled to a second capacitor. The capacitances of the first capacitor and the second capacitor may be set to tune out self-inductances of the source coil and the intermediate coil. In embodiments, the source coil is to inductively power the intermediate coil, which is to inductively power a load coil positioned a distance away from the intermediate coil. In various embodiments, the distance is between about five and 30 times a largest distance between sides of the load coil. The inductances of the source coil, the intermediate coil, and the load coil may be set so that mutual inductances thereof cause the source coil, the intermediate coil, and the load coil to resonate at an identical frequency and maximize power transfer efficiency.

In additional embodiments, the apparatus discussed above may be extended to include a range extender associated with the load coil, to make inductive coupling between the source and load coils possible at greater distances, e.g., about 100 to about 1000 times a largest distance between sides the load coil. The range extender may include a second intermediate coil surrounding the load coil and that is coupled with an additional capacitor. The range extender may also include a third intermediate coil surrounding the second intermediate coil and that is coupled with yet another capacitor. The second intermediate coil and the third intermediate coil may be co-centered with each other, but need not be co-centered with the load coil or a projection of the load coil, as long as the load coil (or its projection) is located within inner walls of the second intermediate coil, thus facilitating off-centered coupling with the load coil. The capacitances of all of the capacitors of these various coils may be set to tune out self-inductances of the source coil, the first intermediate coil, the load coil, the second intermediate coil, and if existing, the third intermediate coil, as will be explained in more detail.

With continued reference to the additional embodiments, if the load coil is on a second plane, the second intermediate coil may be located on a third plane that is parallel to the second plane. In various embodiments, the third plane is identical to the second plane or is located a second distance away from the third plane (whether closer to or farther away from the first plane of source coil). The second distance may be less than 10 times a length of a side of the load coil.

FIG. 1A is a diagram of an example of a wireless body area network system 100 according to an embodiment. The wireless body network 100 may include a server 104 (or other computing device), a smartphone 108 or other mobile device with add-on detection capability, and a body-implantable device 112 such as a dielet or other body-implantable device such as that monitors the health of the animate host.

Figure 1B:
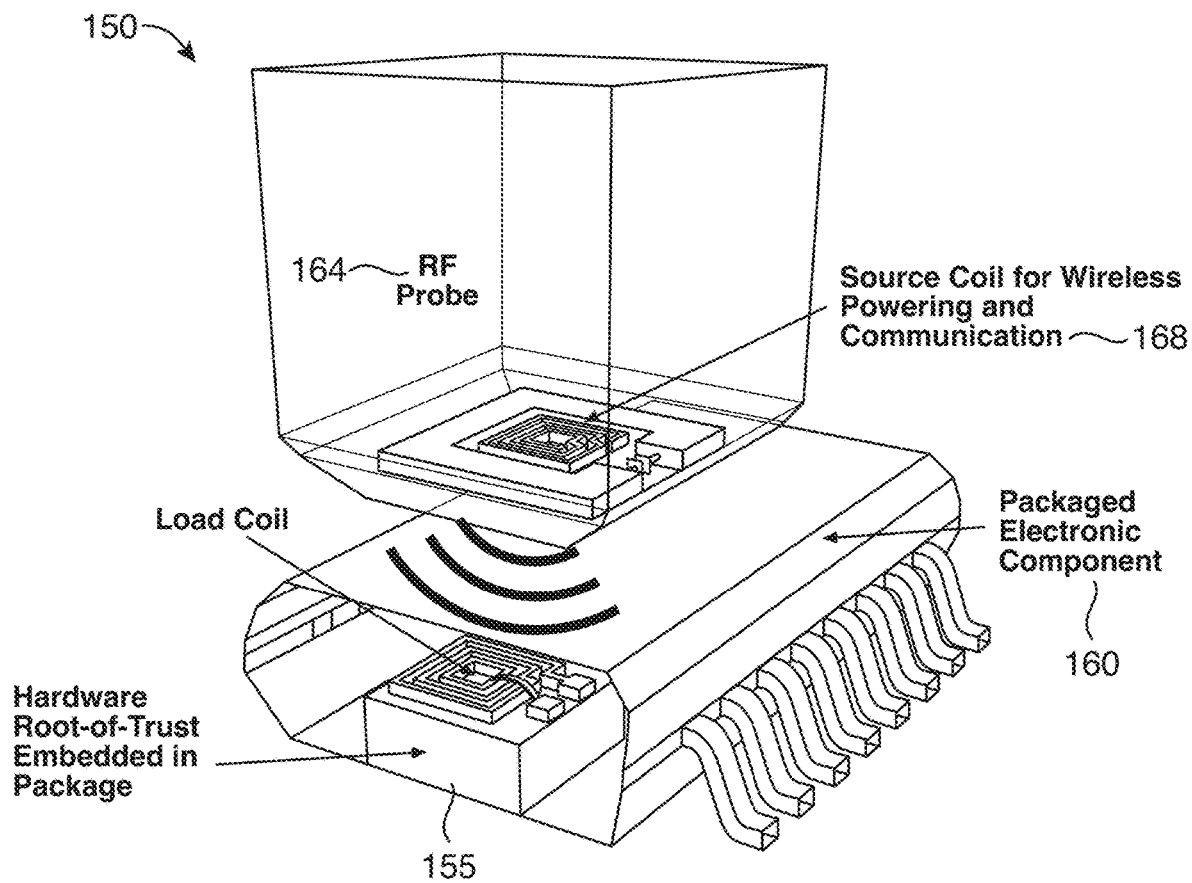
FIG. 1B is a perspective, cut-away view of a system for probing a hardware root of trust embedded in a packaged electronic component according to an embodiment.

FIG. 1B is a perspective, cut-away view of a system 150 for probing a hardware root of trust 155 embedded in a packaged electronic component 160 according to an embodiment. The system 150 may further include a radio frequency (RF) probe 164 with a source coil 168 for wireless powering and communicating with the hardware root of trust 155. The hardware root of trust aims to battle counterfeiting and establish security measures in electronic components and their supply chains at a very low cost.

In various embodiments, the applications of wireless power transfer illustrated in FIGS. 1A and 1B share the technical challenge of powering and communicating to extremely small apparatuses that are electrically isolated by either body tissues or component packages. One solution would be establishing a near-field power transfer (WPT) and communication link between the chip-scale apparatus and the external world without demanding allocation of already-crowded RF spectrum. However, the small form factor of implantable devices or hardware root of trust requires long-distance resonant inductive power transfer with high efficiency.

Prior work on resonant inductive coupling systems focused on multiple equally sized coils separated by a "mid-distance" (~2-3 coil diameters). The coils are large (e.g., multiples of 10 cm) and resonant frequencies are low in the MHz range. Analysis of these systems involving reflected load theory, coupled mode theory, and a combination of both have been reported. However, these models assume negligible non-adjacent coil coupling as well as automatic impedance matching, which do not comport with real-world applications. Thus, these approaches do not address the challenges of powering a microscopic apparatus from a macroscale source, a scenario in which the allowable coil sizes are drastically different in scale and designed so that couplings between any two coils are comparable.

There are several challenges involved in establishing a wireless link when the device size is so small. Practical implementations of such an inductive link may require a coupling distance of at least five times the coil diameter (>0.5 mm), which degrades the overall power transfer efficiency (PTEF). The coil diameter may also be referred to as the largest distance across sides of the coil, as some coils are square or other shapes than circular. The PTEF and communication characteristics of the link are also susceptible to misalignment between the source and load coils (e.g., if the RF transmitter is manually aligned). Finally, there is the difficulty of designing a technology platform that is scalable within the various available bands in the already crowded RF spectrum.

Figure 2A:
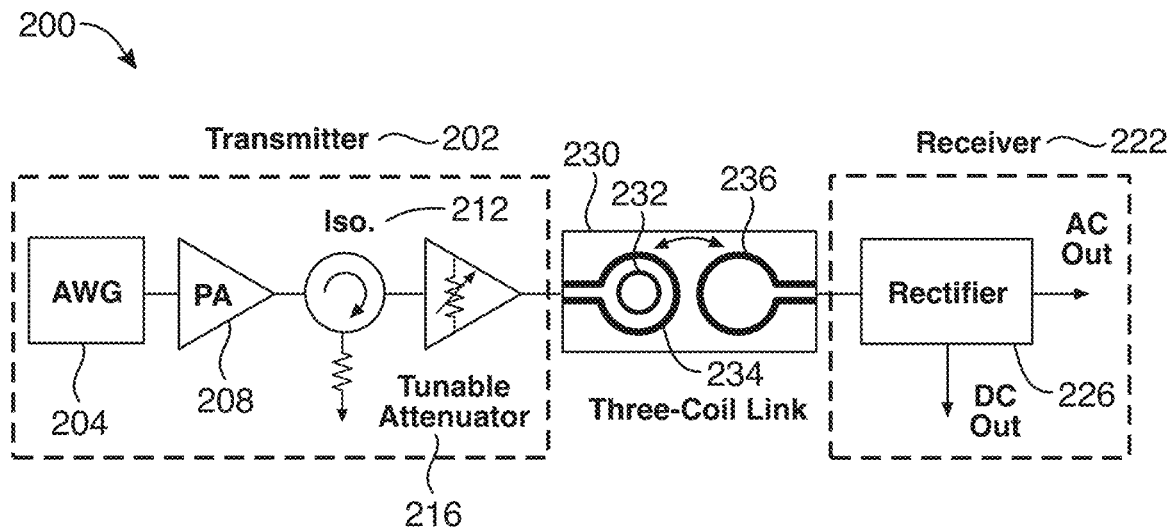
FIG. 2A is a circuit diagram of a system for simultaneous wireless power transfer and communication according to an embodiment.

FIG. 2A is a circuit diagram of a system 200 for simultaneous wireless power transfer and communication according to an embodiment. The system 200 may include a radio frequency (RF) transmitter 202, an RF receiver 222, and a three-coil linking structure 230 for power transfer between the RF transmitter 202 and the RF receiver 222. In various embodiments, the RF transmitter 202 may include an arbitrary waveform generator (AWG) 204, which is coupled to a power amplifier (PA) 208, which is coupled to an isolator 212, and a tunable attenuator 216 coupled to the isolator 212. The RF receiver 222 may further include a rectifier 226, which includes a rectifier stage and an envelope detector stage. In embodiments, the three-coil linking structure 230 may be composed of a source coil 232, an intermediate coil 234, and a load coil 236. The intermediate coil 234 may surround the source coil 232 and be coupled to the RF transmitter 202 and provide inductive linking to the load coil 236, which may be coupled to the RF receiver 222.

In various embodiments, the AWG 204 may be a 50 gigabit per second (GB/s) Tektronix AWG70001A, which may be fed to a Mini-circuits ZVE-3 W-83+ power amplifier (e.g., the PA 208) to deliver a high-power modulated RF signal to the three-coil linking structure 230. The isolator 212 may be implemented to protect the output of the PA 208 while the tunable attenuator 216 may be used to precisely control the output power of the RF transmitter 202. The source and load coils of the three-coil linking structure 230 may be wire-bonded to PCBs in order to interface with the transmitter circuit 202 and the receiver circuit 222.

In disclosed embodiments, using the disclosed three-coil designs, which will be discussed in more detail, wireless power transfer was performed at 2.48 GHz, demonstrating the support of simultaneous wireless power transfer and communication. The RF transmitter 202 was used to pass an amplitude shift keying (ASK)-modulated signal through the wireless three-coil linking structure 230, which was fed to the rectifier circuit 222 that simultaneously rectified and demodulated the RF signal. The three-coil linking technology leverages the mutual coupling between multiple coils to enhance the power transfer efficiency between asymmetrically-sized coils over a distance of more than five times a largest distance across sides of the load coil, as will be discussed in more detail. A second three-coil design has also been fabricated at a higher frequency to validate the scalability of this technology platform for other unlicensed bands. A 5.7 GHz three-coil link was measured in a customized experimental testbed to account for lateral misalignment effects.

Figure 2B:
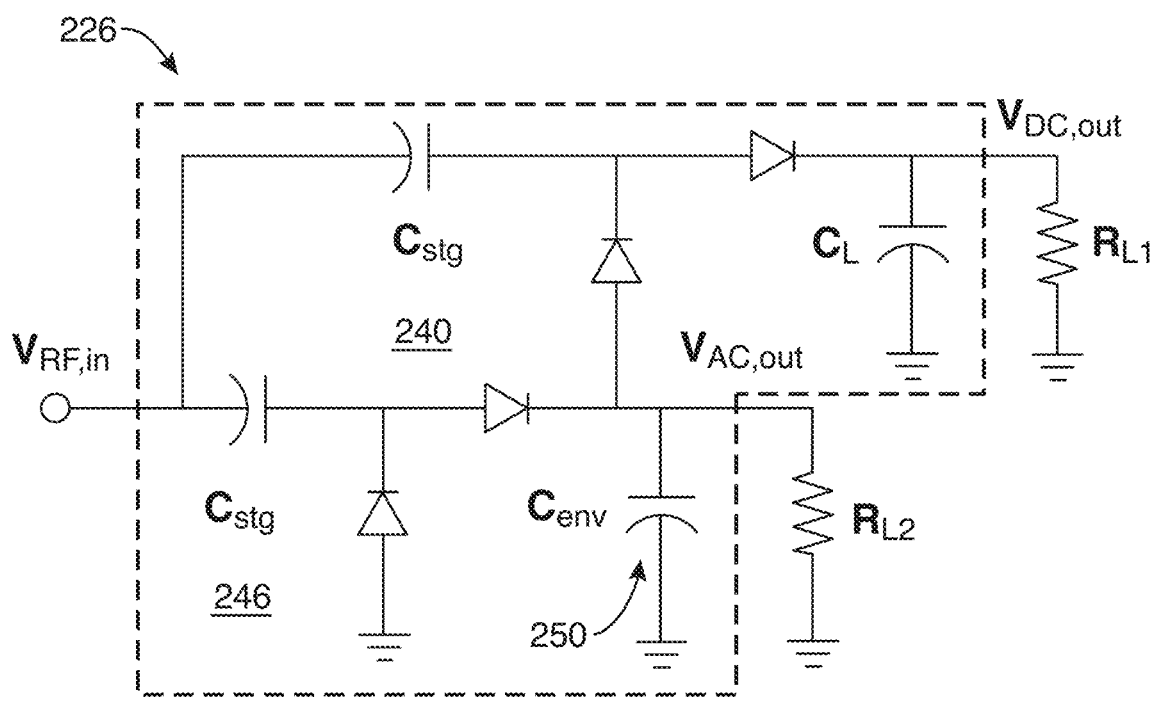
FIG. 2B is a circuit schematic of a rectifier and envelope detector of the system of FIG. 2A according to an embodiment.

FIG. 2B is a circuit schematic of the rectifier 226 (and envelope detector) of the system of FIG. 2A. According to an embodiment, the rectifier 226 may be a modified two-stage Dickson rectifier with load resistances $R_{L1}$ and $R_{L2}$. In order for the rectifier 226 to support simultaneous RF-DC conversion and ASK demodulation, a power splitting technique may be employed. Part of the received RF signal may be sent along one branch of the rectifier 226 to be converted to DC power while the other part is converted to a baseband signal using an envelope detector. The physical implementation of the rectifier 226 may be a Dickson-based multiplier since its low input impedance reduces the impedance mismatch to the receiving coil.

In embodiments, a first stage 240 of the rectifier 226 builds up charge that is pumped to a second stage 246 of the rectifier 226 while simultaneously operating as an envelope detector, using an envelope detector stage 250 to demodulate the incoming RF waveform. The compact design is attractive since it does not require separate rectification and demodulation circuits. This means there will be more space available for other circuitry on the integrated chip (IC) implementation for a fully integrated 0.1 mm by 0.1 mm chip. The challenge associated with this design is the resistive loading of the first stage 240, e.g., the resistance of $R_{L1}$, which may reduce the overall RF-DC conversion efficiency of the rectifier 226. This consequence can be mitigated by reducing impedance mismatch and selecting component values to ensure the required amount of DC power is generated.

In order for the envelope detector stage 250 to successfully demodulate an incoming ASK-modulated signal, its component parameters are to satisfy the following inequality $$\frac{1}{f_c} \ll R_{env} C_{env} \ll \frac{1}{f_m} \quad (1)$$

where $f_c$ is the carrier frequency and $f_m$ is the modulation frequency. This means for a 2.48 GHz signal modulated at a rate of 1 Mb/s, the resistive-capacitive (RC) time constant of the envelope detector may be between 400 picoseconds (ps) and 1 microsecond (µs). After several design iterations to obtain acceptable values for the output DC voltage and voltage swing of the demodulated output for an incoming RF signal at 2.48 GHz, the component values listed in Table 1 were obtained.

TABLE 1

| Component | Value |
|---|---|
| $C_{stg}$ | 36 pF |
| $C_{env}$ | 120 pF |
| $C_L$ | 10 nF |
| $R_{env}$ | 1.5 kΩ |
| $R_L$ | 1.5 kΩ |
| Diodes | HSMS-2852 |

The design was simulated with harmonic balance and transient analyses using the Agilent Advanced Design Systems (ADS) software. The RF-DC conversion efficiency, as defined in, is given by $$\eta_c = \frac{\text{DC Output Power}}{\text{RF Input Power}} \quad (2)$$

Since the input RF waveform was ASK modulated with a modulation depth of −3 dB using a repeated bit sequence of '1101010' at a rate of 1 Mb/s, the average input power can be calculated as $$P_{avg} = \frac{N_H P_H + N_L P_L}{N_H + N_L} \quad (3)$$

where NH and NL are the number of high and low states in the bit sequence, respectively and PH and PL are the associated powers of the high and low states, respectively. For an average input power of 1.2 mW, the rectifier 226 had a simulated conversion efficiency of 19.6%. The moderate conversion efficiency is a consequence of the power splitting technique, but the output DC power of the rectifier is still sufficient for low power applications.

With additional reference to FIG. 2B, the rectifier 226 may be implemented on a printed circuit board (PCB) and the outputs measured using an Agilent MSO7104B Oscilloscope. A 20 dBm RF signal at 2.48 GHz modulated at a rate of 1 Mb/s may be transmitted to the input of the three-coil linking structure 230. The modulated signal may be a repeated bit stream of '1101010' with a modulation depth of 3 dB, for testing purposes. During testing, the three-coil linking structure 230 and the rectifier 226 delivered 0.136 mW of DC power to a 4.7 KΩ load while simultaneously providing a demodulated baseband signal for communication. The large overall RF-DC conversion efficiency of the three-coil linking structure 230 and the rectifier 226 was boosted by the parasitic coupling of the PCB transmission lines.

Figure 3:
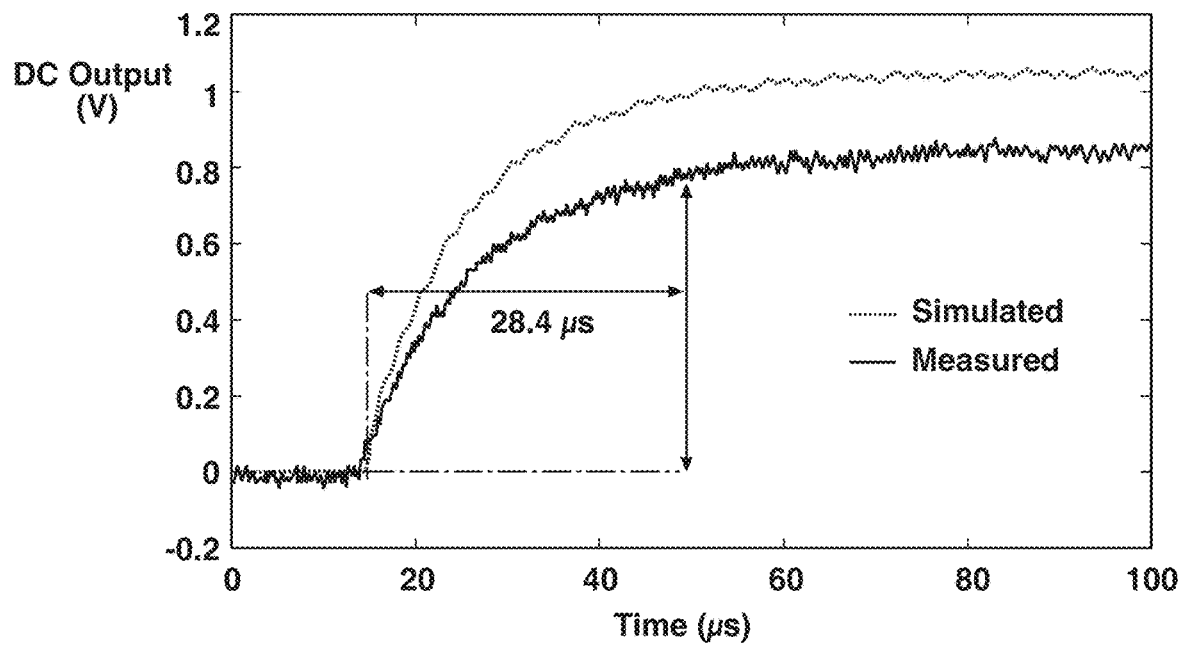
FIG. 3 is a graph of simulated and measured direct current (DC) rise time of an output of the rectifier of FIG. 2A.

FIG. 3 is a graph of simulated and measured direct current (DC) rise time of an output of the rectifier 226 of FIG. 2A. As illustrated, the DC output of the rectifier 226 had a measured 0-90% rise time of 28.4 µs. The DC output had a steady-state value of around 800 mV, which corresponds to 0.136 mW delivered to the 4.7 k load.

Figure 4:
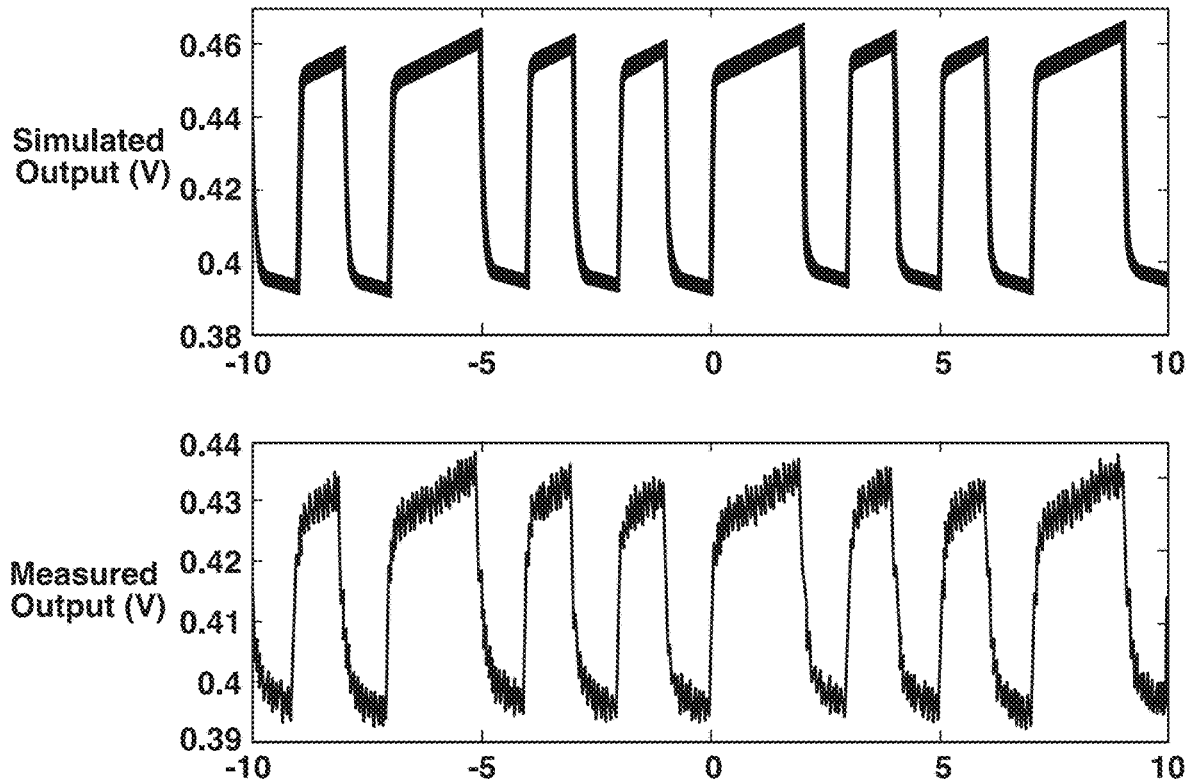
FIG. 4 is a graph of simulated and measured alternating current (AC) output of the envelope detector stage of the rectifier of FIG. 2A for a repeated bit sequence of 1101010 at one ("1") megabits per second according to an embodiment.

FIG. 4 is a graph of simulated and measured alternating current (AC) output of the envelope detector stage of the rectifier 226 of FIG. 2A for a repeated bit sequence of 1101010 at one ("1") megabits per second according to an embodiment. The measured output waveform had a DC offset of about 415 mV with a voltage swing of around 30 mV. To validate the frequency scalability of the three-coil technology platform for use in other unlicensed bands, a 5.7 GHz three-coil design was fabricated and implemented in a custom experimental testbed to measure the effects of lateral misalignment.

Figure 5A:
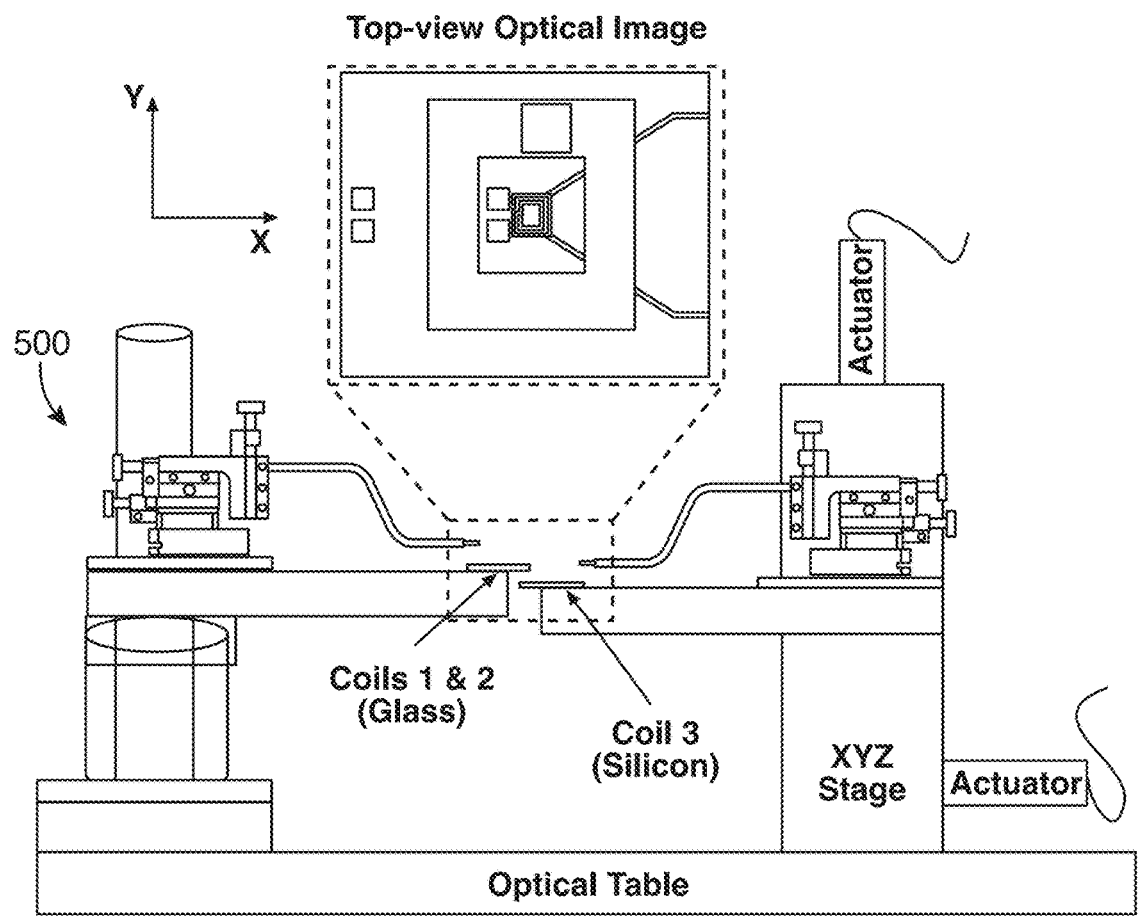
FIG. 5A is a side view of a measurement testbed with, in the inset, a top view of fabricated three-coil devices for misalignment measurements according to an embodiment.

FIG. 5A is a side view of a measurement testbed 500 with, in the inset, a top view of fabricated three-coil devices for misalignment measurements according to an embodiment. In one embodiment, a capacitor may be loaded onto the intermediate coil to tune out its self-inductance at a particular frequency. This allows the three-coil technology platform to be used at one of several design frequencies by properly sizing a load capacitor coupled to the intermediate coil.

Figure 5B:
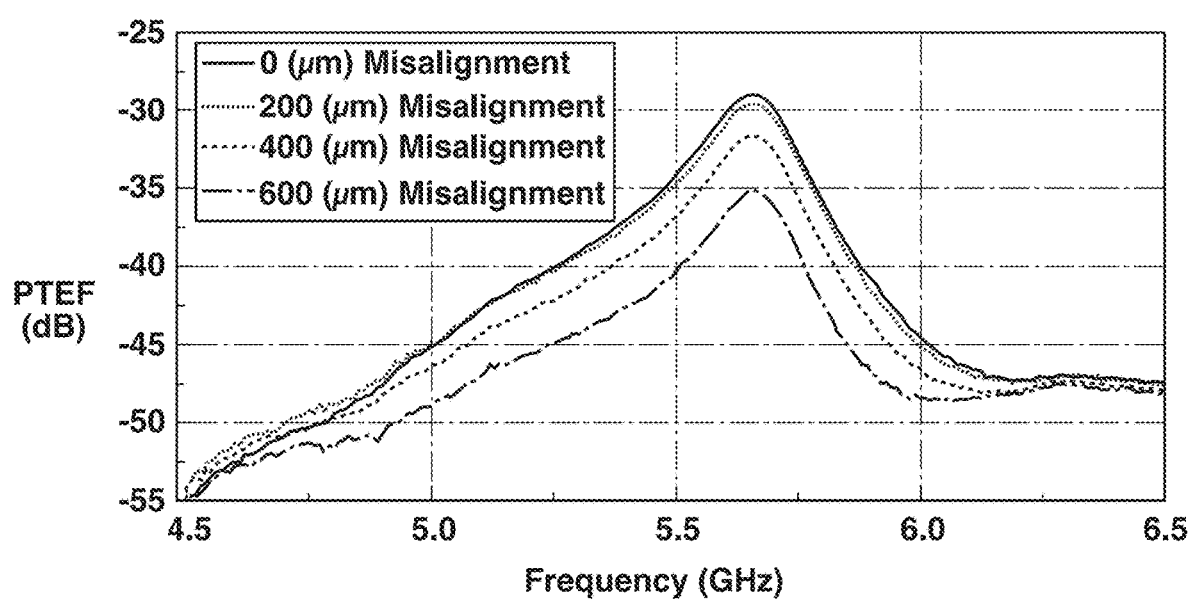
FIG. 5B is a graph illustrating results of power transfer efficacy between the source coil and intermediate coil for a 5.7 GHz tri-coil design with various lateral misalignment distances for a vertical separation distance of one ("1") millimeter (mm) according to an embodiment.

FIG. 5B is a graph illustrating results of power transfer efficacy between the source coil and the intermediate coil for a 5.7 GHz three-coil design with various lateral misalignment distances for a vertical separation distance of one ("1") millimeter (mm) according to an embodiment. As illustrated, the source coil and the intermediate coil, including the load capacitor for operation at 5.7 GHz, were fabricated on a glass sample and the load coil was fabricated on a silicon sample. Each 10 mm by 20 mm sample was suspended over an aluminum platform and held in place by a set of vacuum holes. The source coil and the intermediate coil were fabricated on glass so that the load coil was visible through the transparent substrate, which was used for alignment purposes. The alignment of the three-coil linking structure was controlled by a set of sub-micron precision translational and rotational platforms. Misalignment measurements were taken by moving the glass and silicon samples with respect to each other along the XY-plane illustrated in the optical image inset of FIG. 5A.

The fabricated three-coil linking structure was measured using an Agilent 5230A PNA and a probe station. The measured lateral misalignment results, with the effects of the transmission line to the load coil de-embedded, are illustrated in FIG. 5B. As illustrated, the 5.7 GHz three-coil design had a measured peak RF power transfer efficiency of −29 dB that degrades by about 6 dB over a lateral misalignment of 600 µm.

As discussed, an inductive wireless power system is particularly appealing for secured short-range operation, considering its non-contacting and non-radiative nature. However, a major challenges of inductively and wirelessly powering chip-scale apparatuses stems from the miniature size of chip-scale apparatus. The effective range of power transfer or communication is limited by the size of the coil that resides on the implanted chip or the hardware root of trust. For a distance exceeding five diameters (or a largest distance between sides) of the coils, the power transfer efficacy diminishes to practically nothing even with high Q coils and magnetic resonance enhanced designs.

Figure 6A:
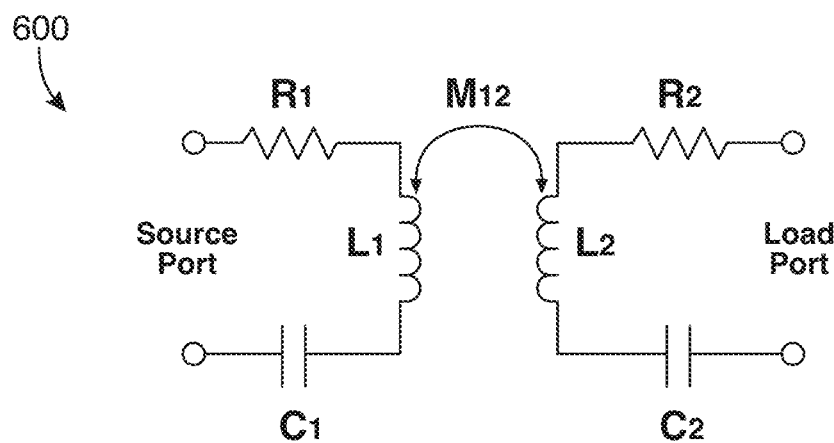
FIG. 6A is a circuit diagram of a conventional two-coil power transfer circuit according to an embodiment.

FIG. 6A is a circuit diagram of a two-coil power transfer circuit 600 according to an embodiment. To illustrate the challenge, first consider a simple system in which a source coil (L1) on a probe is inductively coupled to a load coil (L2) on a miniature chip via the magnetically enhanced resonance. The resonance is facilitated by loading the probe and chip coils with different capacitances, C1 and C2, respectively. The coils and the capacitors form two LC resonators that are coupled through the mutual inductance ($M_{12}$), and in combination resemble a coupled resonator-based filter. Similar to analyzing the insertion loss of a filter, the PTEF, namely $|S_{21}|^2$ of the two-port network formed by the probe and chip coils, can be determined by the mutual inductance between the two coils ($M_{12}$), port impedance ($Z_{0i}$), and coil resistances ($R_i$) as follows:

$$S_{21} = \frac{j\omega M_{12}\sqrt{Z_{01}Z_{02}}}{(\omega M_{12})^2 + (Z_1 + Z_{01})(Z_2 + Z_{02})} \quad (1)(4)$$

where $Z_1$ and $Z_2$ are the impedances looking into the source port and load port, respectively. In one embodiment, $Z_1 = R_1 + j\omega L_1 - 1/(j\omega C_1)$, and $Z_2 = R_2 + j\omega L_2 - 1/(j\omega C_2)$.

To fully capture the loss and resonant frequency ($\omega$) in coupling, we define a coupling quality factor ($F_{ij}$) between coil i and j, similar to the definition of a quality factor for an inductor.

$$F_{ij} = \frac{\omega M_{ij}}{\sqrt{(R_i + Z_{0i})(R_j + Z_{0j})}} \quad (5)$$

Where $M_{ij}$ is the mutual inductance between coil i and j. Then, Equation 4 may be alternatively expressed as:

$$PTEF = \frac{1}{1 + R_1/Z_{01}} \frac{1}{1 + R_2/Z_{02}} \frac{4}{(F_{21} + 1/F_{21})^2} \quad (6)$$

Figure 6B:
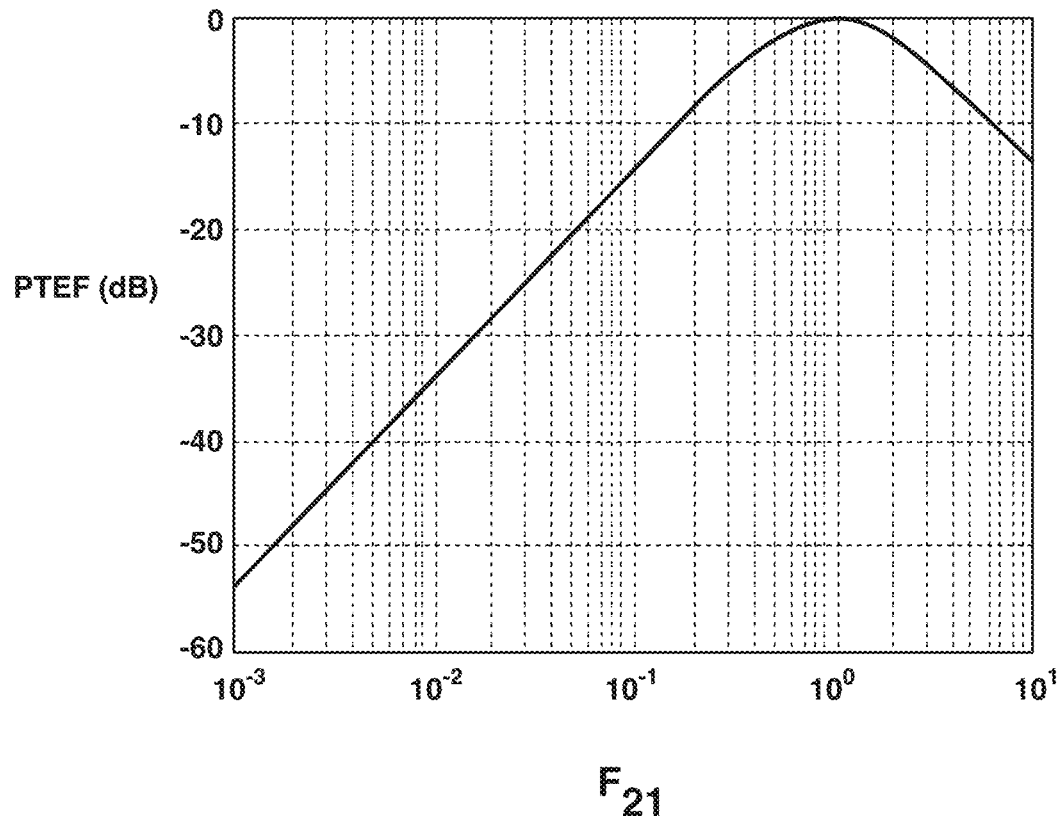
FIG. 6B is a graph illustrating analytically predicted power transfer efficiency (PTEF) of the two-coil circuit versus a coupling quality factor according to an embodiment.

FIG. 6B is a graph illustrating analytically predicted power transfer efficiency (PTEF) of the two-coil circuit 600 versus the coupling quality factor according to an embodiment. As illustrated, the PTEF at the resonance maximizes at $F_{21}=1$, a value attainable when the coils are distanced less than one coil diameter apart. As the distance exceeds five times the small coil size, the PTEF is reduced to below −35 dB due a diminishing $F_{21}=9\times10^{-3}$. Therefore, the input impedance seen by the source (e.g., at the source port) may be only fraction of an Ohm. The substantial impedance mismatch may cause most energy to be reflected back to the source.

Figure 7A:
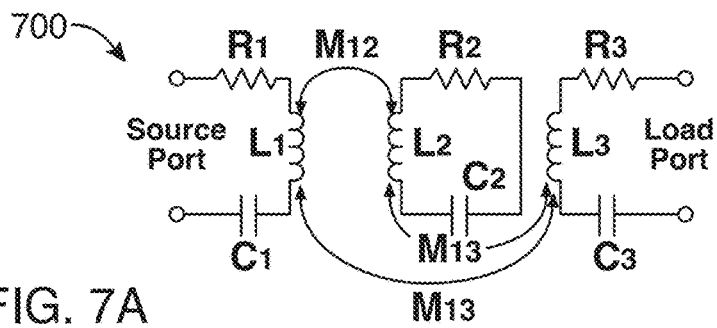
FIG. 7A is a circuit diagram of a three-coil power transfer circuit according to an embodiment.

FIG. 7A is a circuit diagram of a three-coil power transfer circuit 700 according to an embodiment. To attain higher PTEF, the three-coil circuit 700 includes an additional coil, e.g., an intermediate coil (L2) on the probe where the load coil is now indicated as L3 at the load port. The three-coil power transfer circuit 700 may be viewed as an impedance matching circuit functioning via the intermediate coil, L2. The intermediate coil may also loaded with a capacitor (C2). The capacitances (C1, C2, and C3) may be chosen to tune out the self-inductances of the three coils, namely the source coil (L1), the intermediate coil (L2), and the load coil (L3). Similar to the two-coil circuit 600, the analytical PTEF may be derived in terms of $F_{ij}$ as:

$$PTEF = \frac{4(F_{31}^2 + F_{21}^2 F_{32}^2)}{(1 + F_{31}^2 + F_{21}^2 + F_{32}^2)^2 + (2F_{21}F_{32}F_{31})^2} \quad (7)$$

Figure 7B:
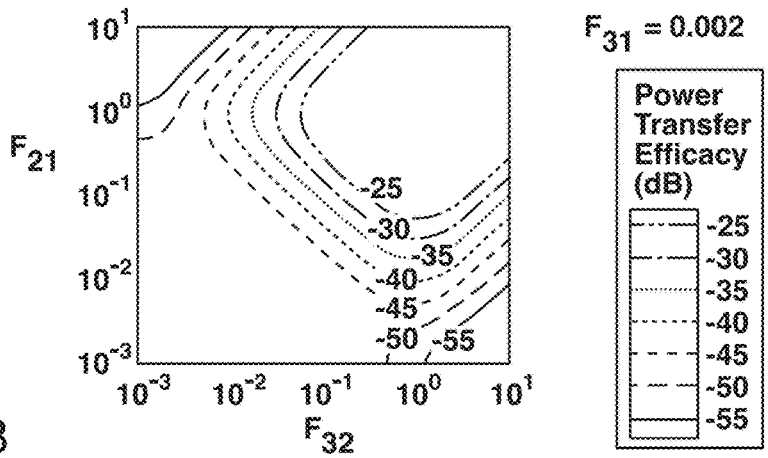
FIGS. 7B, 7C, and 7D illustrate a contour plot of PTEF with constant $F_{31}$, $F_{32}$, and $F_{21}$, respectively, according to an embodiment.
Figure 7C:
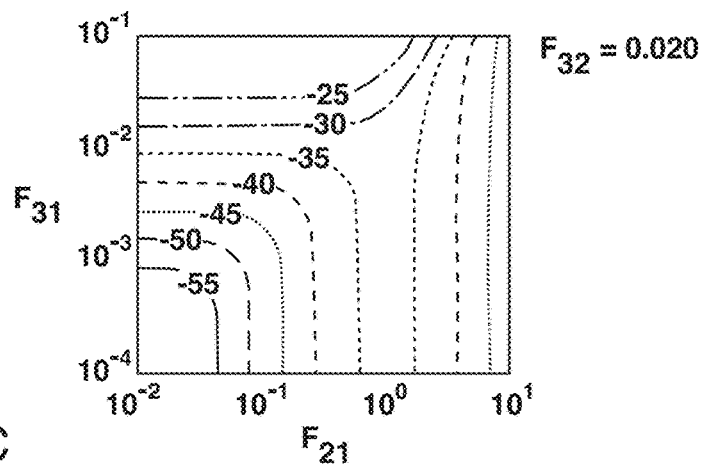
Figure 7D:
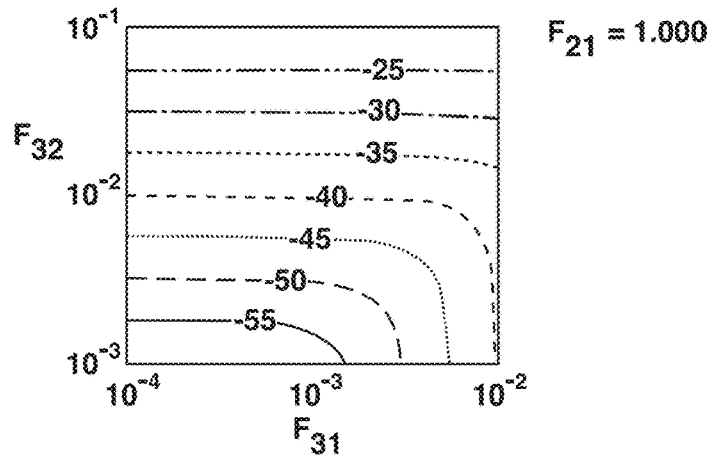

FIGS. 7B, 7C, and 7D illustrate a contour plot of PTEF with constant $F_{31}$, $F_{32}$, and $F_{21}$, respectively. In other words, the analytical PTEFs, predicted by Equation 7 and as a function of $F_{ij}$, are plotted in FIGS. 7B, 7C, and 7D, respectively, in the format of contours. The contour plots indicate that the PTEF of a three-coil circuit 700 also maximizes at $F_{21}=1$, within the limitation that the $F_{31}$ is smaller than 9×10-3. Guided by the analytical model, any optimal designs should have a $F_{21}$ equal to one ("1") and a $F_{32}$ as large as possible. As an example to validate the analytical approach based on Fij, a three-coil circuit may be designed to maximally transfer power to a 100 μm by 100 μm chip-scale apparatus over a distance of 0.5 mm. The size of the chip-scale apparatus and its distance to the probe set the maximum attainable Fij. Then, analyses based on HFSS as well as closed form equations are used to translate the desired Fu ($F_{32}=0.056$, $F_{31}=0.0019$, and $F_{21}=1.1$) to the physical designs of the coils that are listed in Table. 2.

TABLE 2

| Design Parameter | Source Coil | Intermediate Coil | Load Coil |
|---|---|---|---|
| Side Length (μm) | 280 | 1450 | 100 |
| Side Width (μm) | 10 | 350 | 3 |
| Coil Thickness (μm) | 10 | 10 | 2 |
| No. of Turns | 5 | 1 | 5 |
| Separation between Adjacent Turns (μm) | 10 | | 3 |

FIG. 8 is a graph of a comparison between analytical and a high frequency structure simulator (HFSS) simulated PTEF according to an embodiment. The designed three-coil circuit 700 may also be holistically modeled in HFSS and the results exhibit excellent agreement with the calculations based on Equation 7. A maximum PTEF of −25.75 dB is theoretically predicted, suggesting an orders-of-magnitude higher PTEF than that of prior WPT systems over a distance five times a largest distance across sides of the source coil.

FIG. 9A is a perspective view of an experimental testbed 900 for testing coil-based power transfer systems according to an embodiment. With reference to FIG. 9A, to validate the power transfer efficacy of the design, the test bed 900 was fabricated to include a 500 μm-thick, high resistivity silicon (Si) wafer with probe coils on the front and chip coil on the back side. The thickness of Si wafer is used to emulate the separation between the probe and chip-scale apparatuses.

FIGS. 9B, 9C, and 9D are, respectively, a) a scanning electron microscope (SEM) image of a fabricated power transfer coil, b) an optical image of a fabricated dielet coil, and c) a method to fabricate the power transfer coils according to an embodiment. The fabrication process, as shown in FIG. 9D, starts with electroplating the probe coils on the front side of the substrate. Though-Si-Vias (TSVs) are then created using potassium hydroxide (KOH)-based etching and electroplated along with the coils on the backside. These TSVs allow for probing from the front of the substrate in the measurements. Last, the bridges are established to connect inner windings of the coils to the probing pads and the wafer is passivated with Benzocyclobutene (BCB).

The fabricated two-coil and three-coil WPT systems were tested with an Agilent 5230A PNA and a probe station. The effect of transmission lines and TSVs has been de-embedded using on-wafer test structures, and the measurement reference planes are moved to the dashed lines, which are labeled as reference planes in FIG. 9A.

Figure 10:
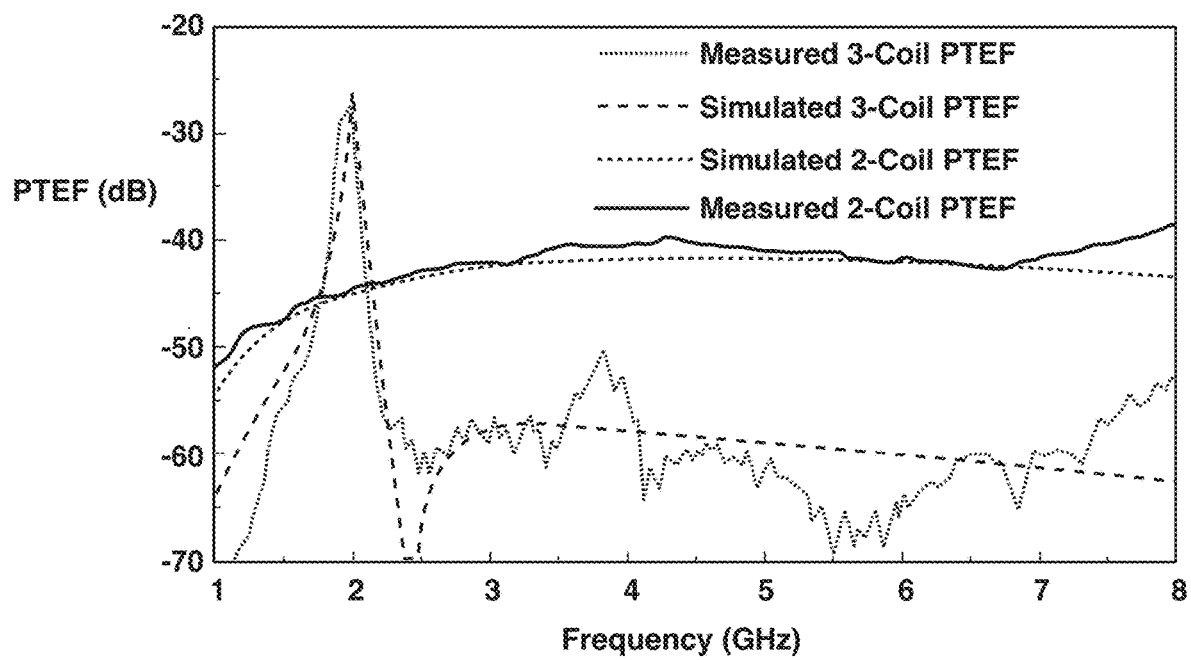
FIG. 10 is a graph that illustrates a comparison of the measured and simulated PTEFs for both two-coil and three-coil power transfer systems according to embodiments.

FIG. 10 is a graph that illustrates a comparison of the measured and simulated PTEFs for both two-coil and three-coil power transfer systems according to embodiments. Excellent agreement has been achieved between the simulations and measurements. For the designed three-coil system, a PTEF of −27 dB has been demonstrated with the fabricated three-coil wireless power transfer system. The mismatch between the simulation and measurement off resonance is due to the low power level that is comparable to noise and the measurement limitations of a power network application.

Figure 11:
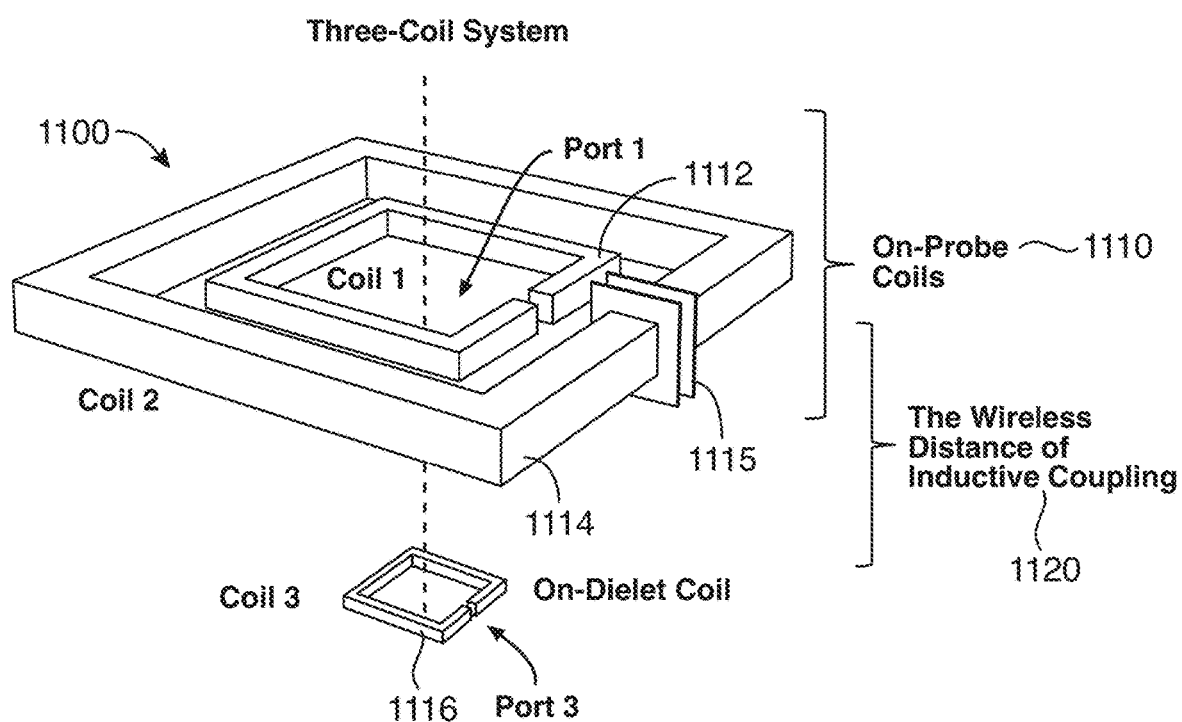
FIG. 11 is a perspective view of a three-coil power transfer system according to various embodiments.

FIG. 11 is a perspective view of a three-coil power transfer system 1100 according to various embodiments. In embodiments, a pair of on-probe coils 1110 may be manufactured as part of a verification probe or the like. The pair of on-probe coils 1110 may include a source coil 1112 and an intermediate coil 1114. The source coil 1112 may be coupled to a power source (e.g., at Port 1) such that current flows through the source coil 1112 when the source coil 1112 is excited by the power source. The source coils may include a first capacitor (not illustrated) coupled in series to the source coil. The intermediate coil 1114 may surround the source coil 1112 and be positioned within an identical plane as the source coil 1112. A second capacitor 1115 may be coupled in series to the intermediate coil, wherein capacitances of the first capacitor and the second capacitor may be set to tune out self-inductances of the source coil and the intermediate coil.

In various embodiments, the source coil 1112 is to inductively power the intermediate coil 1114, which is to inductively power a load coil 1116 positioned a distance away from the intermediate coil. Inductances of the source coil 1112, the intermediate coil 1114, and the load coil 1116 may be set so that mutual inductances thereof cause the source coil, the intermediate coil, and the load coil to resonate at an identical frequency and maximize power transfer efficiency. A wireless distance of inductive coupling 1120 may be between about five to about 30 times a largest distance across sides of the source coil 1112.

Figure 12:
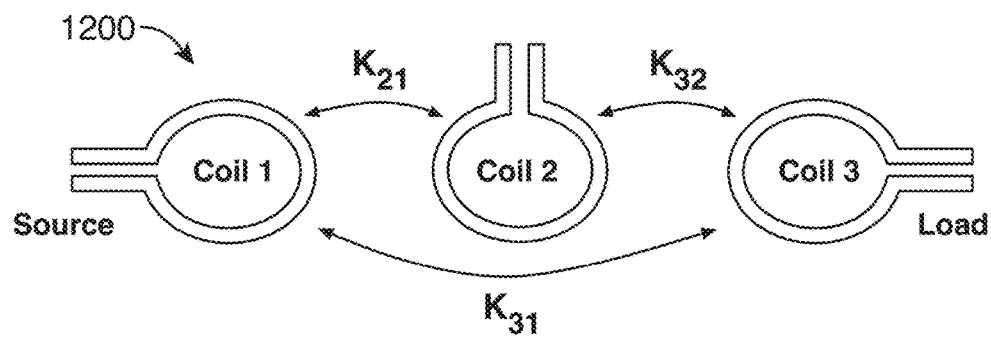
FIG. 12 is a circuit diagram of a three-coil power transfer system according to an additional embodiment.

FIG. 12 is a circuit diagram of a three-coil power transfer system 1200 according to an additional embodiment. In this additional embodiment, each of the source coil (Coil 1), the intermediate coil (Coil 2), and the load coil (Coil 3) may be coil-shaped. In embodiments, the coupling between the source coil and the intermediate coil may be $K_{21}$, the coupling between the source coil and the load coil may be $K_{31}$, and the coupling between the intermediate coil and the load coil may be $K_{32}$. These couplings ($K_{21}$, $K_{31}$, $K_{32}$) may cause the power transfer from the source coil to the load coil.

Figure 13:
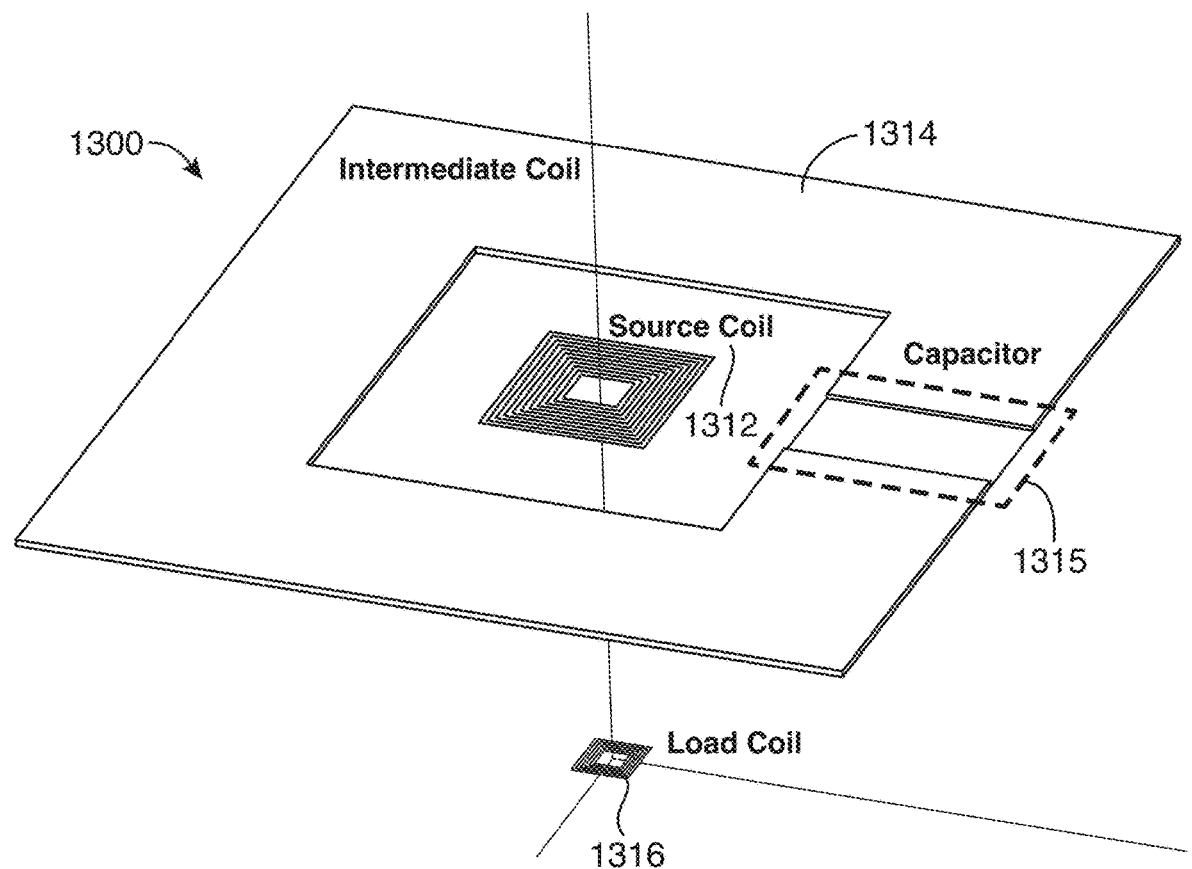
FIG. 13 is a perspective view of a three-coil power transfer system according to an additional embodiment.

FIG. 13 is a perspective view of a three-coil power transfer system 1300 according to an additional embodiment. The three-coil power transfer system 1300 may include a source coil 1312 made up of a certain number of turns, an intermediate coil 1314, which may be a single widened coil, and a load coil 1316. The load coil 1316 may also be made up a certain number of turns and be located a distance away from the source and load coils 1312 and 1314. A capacitor 1315 may be positioned within a gap of the intermediate coil 1314, and each of the source coil 1312 and the load coil 1316 may also include built-in capacitors, such that capacitance of each of these three capacitors may be set to tune out the mutual inductances of the source coil 1312, the intermediate coil 1314, and the load coil 1316.

Additionally, the source coil 1312, the intermediate coil 1314, and the load coil 1316 may be designed with inductances that, when combined with their corresponding capacitances, enhance resonance in tuning out mutual inductances. This may mean specifically choosing the numbers of turns of each of the source coil 1312 and the load coil 1316, choosing a width of the intermediate coil, and setting respective capacitances in combinations with respective inductances. The distance between the source coil 1312 and the load coil 1316 may be set to be between five and 30 times a largest distance across sides of the source coil 1312. In one embodiment, inductances of the source coil, the intermediate coil, and the load coil are set so that mutual inductances thereof cause the source coil, the intermediate coil, and the load coil to resonate at an identical frequency between about 2 GHz and 6 GHz (or other similar desired frequency range) and to maximize power transfer efficiency.

Figure 14:
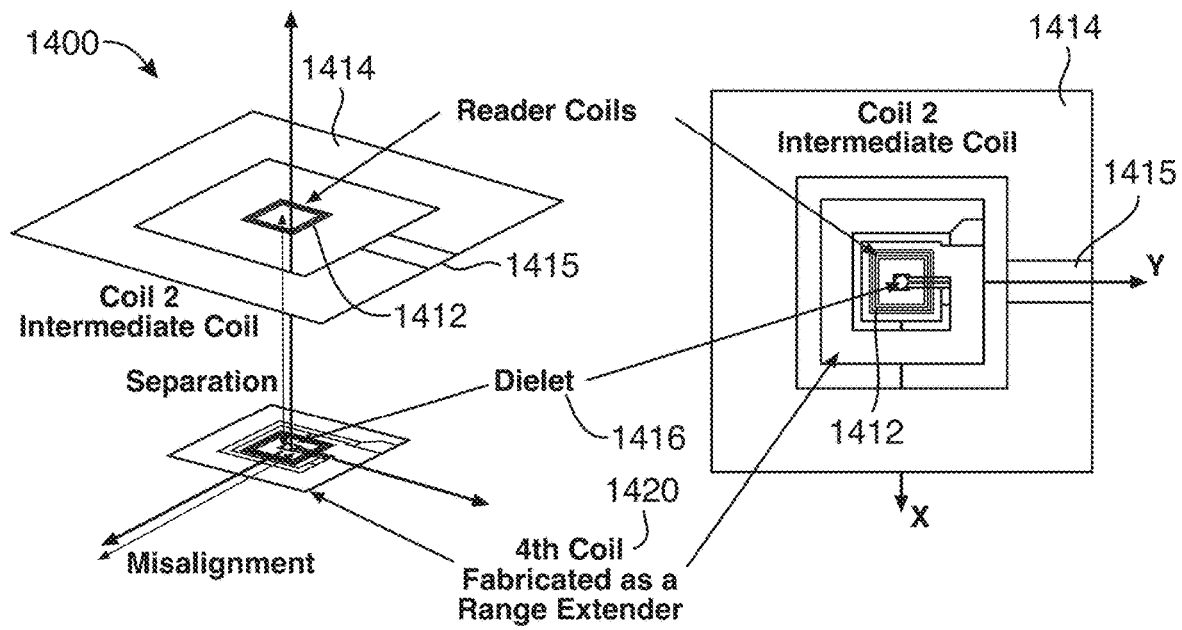
FIG. 14 is a perspective view of four-coil power transfer system according to an embodiment.

FIG. 14 is a perspective view of four-coil power transfer system 1400 according to an embodiment. The four-coil power transfer system 1400 may include a power source (not shown) and a source coil 1412 coupled to the power source such that current flows through the source coil 1412 when the source coil is excited by the power source. The source coil 1412 may also be referred to as a reader coil. The four-coil power transfer system 1400 may further include a first capacitor (not shown) coupled in series to the source coil. A first intermediate coil 1414 may co-centrically surround the source coil and be positioned within an identical plane as the source coil 1412, e.g., a first plane. A second capacitor 1415 may be coupled in series to the first intermediate coil 1414. A load coil 1416 may be positioned a distance away from the source coil and to be inductively powered by the intermediate coil 1414. A third capacitor (not illustrated) may be coupled in series to the load coil 1416.

In various embodiments, inductances of the source coil 1412, the first intermediate coil 1414, and the load coil 1416 are set so that mutual inductances thereof cause the source coil 1412, the first intermediate coil 1414, and the load coil 1416 to resonate at an identical frequency between about 2 GHz and 6 GHz (or some other similar desired frequency range) and to maximize power transfer efficiency. Furthermore, capacitances of the first capacitor, the second capacitor 1415, and the third capacitor may be set to tune out self-inductances of the source coil 1412, the first intermediate coil 1414, and the load coil 1416. In one embodiment, the distance is between about five to 30 times a largest distance across two sides of the load coil 1416, e.g., a diameter of the load coil 1416.

In various embodiments, the four-coil power transfer system 1400 includes a second intermediate coil 1420 surrounding the load coil 1416 and positioned within a second identical plane as the load coil 1416. The second intermediate coil 1420 may concentrically surround the load coil 1416 in one example. In one embodiment, the second intermediate coil 1420 functions as a range extender 1425, which has low fabrication cost due to being easy to implement without additional modifications to the dielet of the load coil 1416. For example, the second intermediate coil 1420 may surround and need not physically connect to the load coil 1416, and may be disposed on flexible substrates. The second intermediate coil 1420 may be placed onto the device plane and with the load coil 1416 within the center portion of the second intermediate coil 1420, so that the second intermediate coil 1420 may inductively couple the load coil to the source coil 1412 through the first intermediate coil 1414. If the load coil 1416 is on a second plane, the second intermediate coil 1420 may be located on a third plane that is parallel to the second plane. In various embodiments, the third plane is identical to the second plane or is located a second distance away from the third plane (whether closer to or farther away from the first plane of source coil). The second distance may be less than 10 times a length of a side of the load coil.

The second intermediate coil 1420 may significantly improve the misalignment tolerance of the system, and therefore, the placement of the load coil 1416 need not be precisely in the center of the second intermediate coil 1420 to facilitate reading by a probe with the source coil 1412, e.g., as long the load coil 1416 (or its projection) is within inner walls of the second intermediate coil 1420. The second intermediate coil 1420 may further facilitate a much greater possible distance between the load coil 1416 and the source coil 1412 without loss of reading ability. For example, the distance may be between about 100 to about 1000 times a largest distance between sides the source coil with use of the second intermediate coil 1420.

In embodiments, the second intermediate coil 1420 may be inductively powered by the first intermediate coil 1414 and is to inductively power the load coil 1416. A fourth capacitor (not illustrated) may be coupled in series to the second intermediate coil. Capacitances of the first capacitor, the second capacitor 1115, the third capacitor, and the fourth capacitor may be set to tune out self-inductances of the source coil 1412, the first intermediate coil 1414, the load coil 1416, and the second intermediate coil 1420, to enhance resonance frequency. In one embodiment, the first capacitor is built into materials of the source coil 1412, the third capacitor is built into materials of the load coil 1416, and the fourth capacitor is built into the materials of the second intermediate coil 1420, and thus need not be illustrated.

In various embodiments, a length of a side of the source coil 1412 may be about 15 percent the length of a side of the first intermediate coil 1414, the length of a side of the load coil 1416 may be about one percent the length of the side of the first intermediate coil 1414, and the length of a side of the second intermediate coil 1420 may be about 15 percent or greater than the length of the side of the first intermediate coil 1414. In further embodiments, a width of a side of the source coil 1412 may be less than about 10 percent the width of a side of the first intermediate coil 1414, a width of a side of the load coil 1416 may be less than one percent the width of the side of the first intermediate coil 1414, and a width of a side of the second intermediate coil 1420 may be less than 30 percent the width of the side of first intermediate coil 1414. These percentages may vary by 5-25 percent based on design parameters, so long as the source coil 1412 fits inside of the first intermediate coil 1414 as illustrated, e.g., the first intermediate coil 1414 concentrically surrounds the source coil 1412.

To numerically show the range extender's ability to extend the powering and communication range from 1 millimeter (mm) to 1 centimeter (cm), a design example of the four-coil power transfer system 1400 was simulated by HFSS. For purposes of the simulation, assume the second intermediate coil 1420 has a side length of about 2000 μm, a side width of about 400 μm, and is a two-turn coil. Assume also that the second intermediate coil 1420 is added to the three-coil power transfer system 1300 introduced with reference to FIG. 13.

Figure 15:
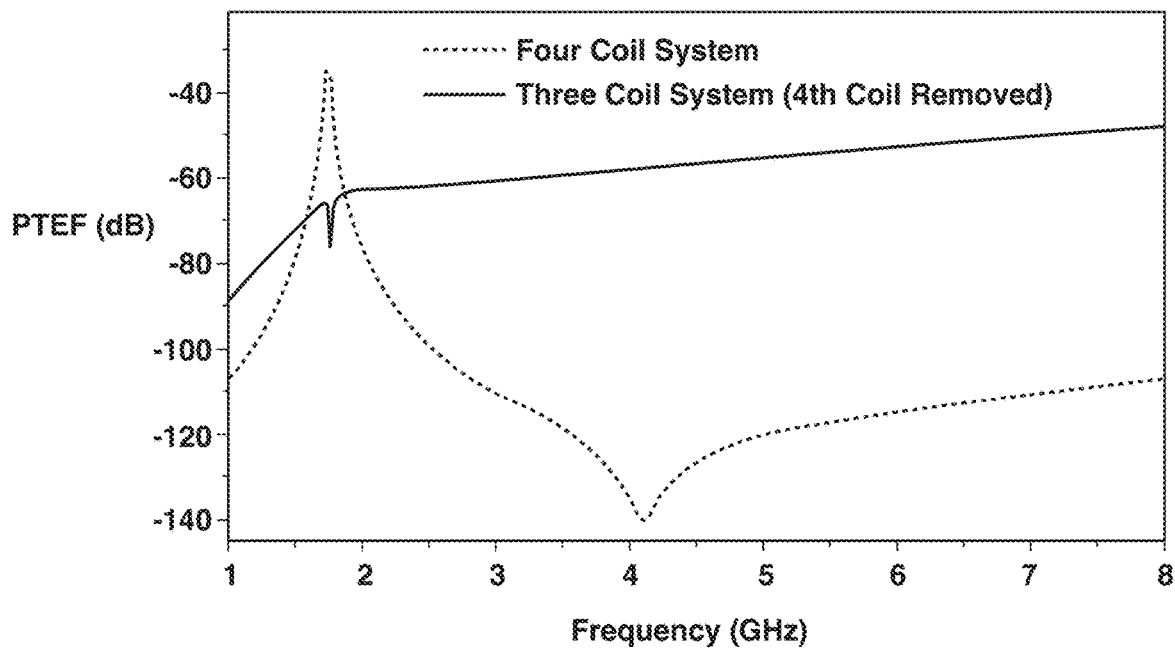
FIG. 15 is a graph illustrating the PTEF of the four-coil power transfer system of FIG. 14 operating over 1 centimeter (cm) separation in comparison to that of the three-coil power transfer system operating over the same separation at perfect alignment according to an embodiment.
Figure 16:
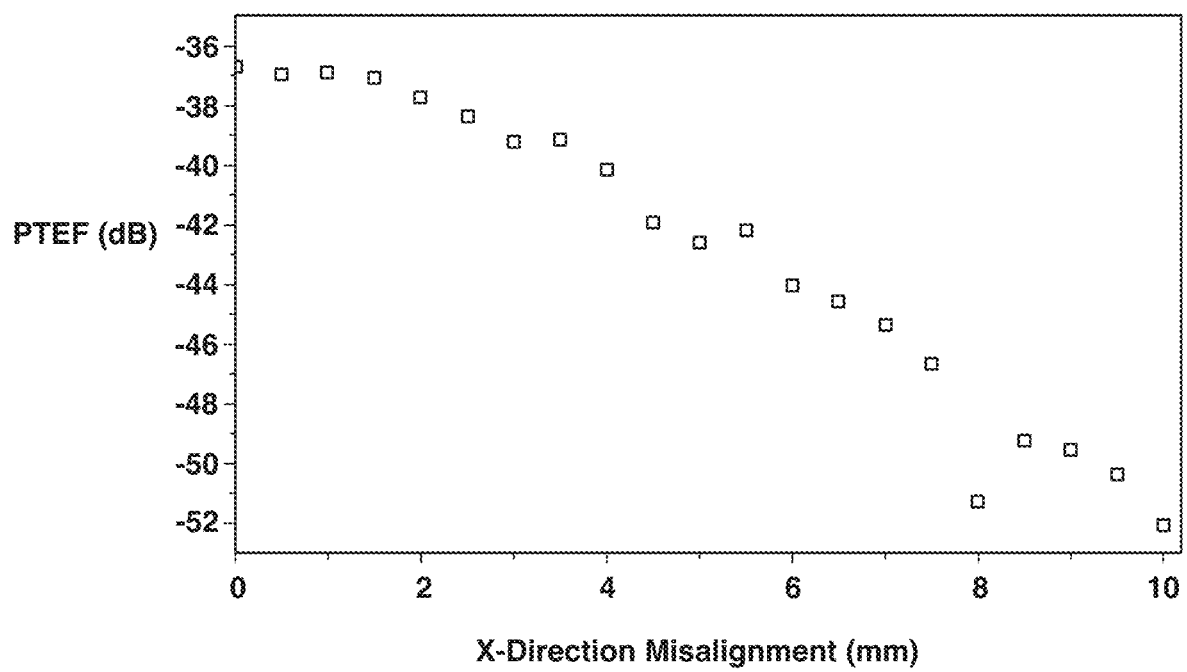
FIG. 16 is a graph illustrating PTEFs versus x-direction misalignment as simulated by the HFSS according to an embodiment.

FIG. 15 is a graph illustrating the PTEF of the four-coil power transfer system 1400 of FIG. 14 operating over 1 cm separation in comparison to that of the three-coil power transfer system 1300 (or other three-coil power transfer system disclosed herein) operating over the same separation at perfect alignment according to an embodiment. As illustrated, the four-coil power transfer system 1400 has −36.7 dB PTEF at 1.7 GHz at perfect alignment and over 1 cm separation. In comparison, the three-coil power transfer system 1300 (without the second intermediate coil 1420) operating over 1 cm separation, the power transmitted to the chip-scale load coil 1316 is too small for the device to function properly. In addition to the enhancement in powering and communication range, the misalignment tolerance is also improved. As shown in FIG. 16, the four-coil power transfer system 1400 has a 5 mm misalignment tolerance for 6 dB PTEF degradation.

FIG. 17A is a perspective view of a five-coil power transfer system 1700 according to an embodiment. FIG. 17B is a top view of the five-coil power transfer system 1700 of FIG. 17A according to an embodiment. The five-coil power transfer system 1700 may include similar components as the four-coil power transfer system 1400, but the second intermediate coil 1420 may now include a third intermediate coil 1722 that is concentrically placed surrounding the second intermediate coil 1420 in the third plane of the second intermediate coil 1420. The fourth capacitor 1421 is now illustrated within the second intermediate coil 1420. A fifth capacitor 1723 may be coupled in series to the third intermediate coil 1722. In embodiments, capacitances of the first capacitor, the second capacitor, the third capacitor, the fourth capacitor 1421, and the fifth capacitor 1723 are set to tune out self-inductances of the source coil 1412, the first intermediate coil 1414, the load coil 1416, the second intermediate coil 1420, and the third intermediate coil 1722.

In the disclosed embodiments, the second intermediate coil 1420 and the third intermediate coil 1722 may act as range extender up to 10 cm of separation. Again, no physical connection is necessary between the load coil 1420 and the range extender coils, e.g., the second intermediate coil 1420 and the third intermediate coil 1722. The physical dimensions of the coils in one embodiment of the five-coil power transfer system 1700 are shown in Table 3. With two range extenders on the device plane, the five-coil power transfer system 1700 may achieve powering and communication with chip-scale load coil of size 100 μm by 100 μm over 10 cm, for example.

TABLE 3

| Design Parameter | Source Coil (#1) | Inter. Coil (#2) | Load Coil (#3) | Inter. Coil (#4) | Inter. Coil (#5) |
| --- | --- | --- | --- | --- | --- |
| Side Length of trace (μm) | 1400 | 9200 | 100 | 1500 | 5000 |
| Side Width of trace (μm) | 80 | 1100 | 3 | 300 | 900 |
| Coil Thickness (μm) | 10 | 10 | 2 | 10 | 10 |
| No. of Turns | 3 | 1 | 5 | 2 | 1 |
| Separation between Adjacent Turns (μm) | 60 | | 3 | | 50 |

FIG. 18 is a graph illustrating the PTEF of the five-coil power transfer system 1700 operating over 10 cm separation in comparison to that of the three-coil power transfer system 1300 (or other three-coil power transfer system disclosed herein) operating over a 1 mm separation at perfect alignment according to an embodiment. As illustrated, the five-coil power transfer system 1700 may have −42.8 dB PTEF at 3.5 GHz and at perfect alignment and over 10 cm of separation. In comparison to the three-coil power transfer system (with physical dimensions in Table 2) operating over 1 mm separation, the PTEF decreases by 5 dB with 100 times increase in separation between the source coil 1412 and the load coil 1416.

Figure 19:
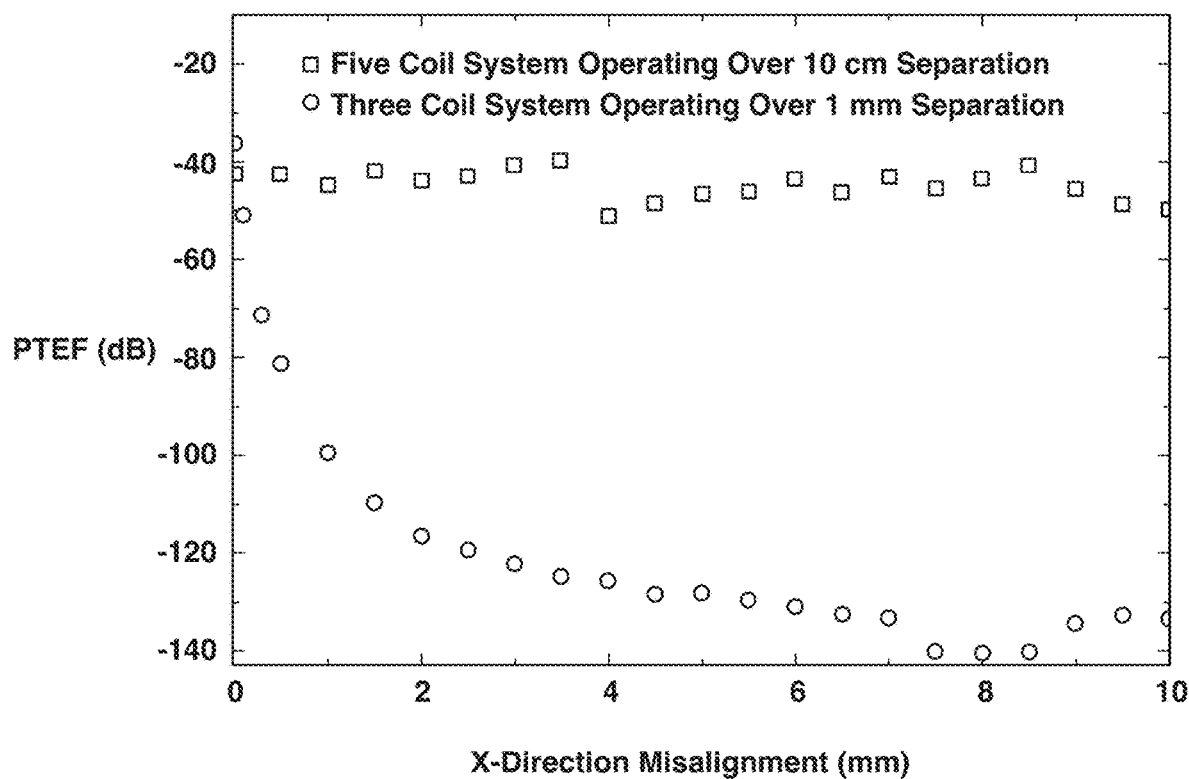
FIG. 19 is a graph is illustrating the PTEFs versus x-directional misalignment of the five-coil power transfer system operating over 10 cm separation in comparison to that of a three-coil power transfer system operating over a 1 mm separation according to an embodiment.

FIG. 19 is a graph is illustrating the PTEFs versus x-directional misalignment of the five-coil power transfer system 1700 operating over 10 cm separation in comparison to that of a three-coil power transfer system operating over a 1 mm separation according to an embodiment. In addition to the enhancement in powering and communication range, the misalignment tolerance is also largely improved. The five-coil power transfer system 1700 operating over 10 cm separation has 5 cm misalignment tolerance for 6 dB PTEF degradation, while misalignment tolerance of the 3-coil power transfer system operating over 1 mm separation is 0.7 mm Thus, the design idea of a range extender facilitates the design of power transfer systems with enhancements in misalignment tolerance and operating range compared to three-coil power transfer systems, while keeping comparable PTEF.

Figure 20:
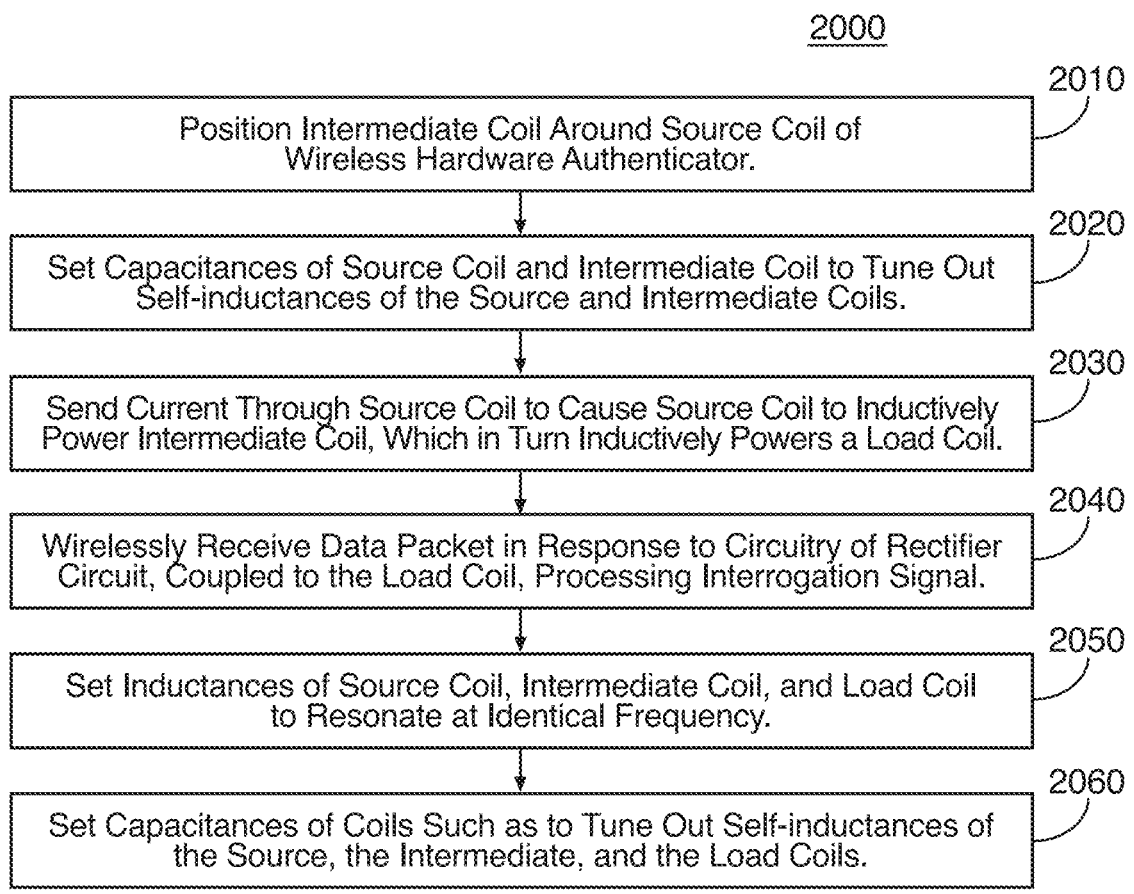
FIG. 20 is a flow chart of a method for inductively, wirelessly powering a load coil (or dielet), according to various embodiments.

FIG. 20 is a flow chart of a method 2000 for inductively, wirelessly powering a load coil (or dielet), according to various embodiments. The method 2000 may be performed on a test bench or fabrication facility, for example. The method 2000 may be performed by processing logic that may comprise hardware (e.g., circuitry, dedicated logic, programmable logic, microcode, etc.), software (such as instructions executed by the processor core(s) 112), firmware or a combination thereof.

In various embodiments, the method 2000 may begin with processing logic concentrically positioning an intermediate coil around a source coil of a wireless hardware authenticator and within an identical plane as the source coil (2010). The method 2000 may continue with the processing logic setting capacitances of a first capacitor coupled in series to the source coil and of a second capacitor coupled in series to the intermediate coil such as to tune out self-inductances of the source coil and the intermediate coil (2020). The method 2000 may continue with the processing logic sending current through the source coil with a power source to cause the source coil to inductively power the intermediate coil, which in turn is to inductively power a load coil positioned a distance away from the source coil, wherein the current includes an interrogation signal (2030). The load coil may be coupled to a rectifier circuit in one embodiment. The method 2000 may continue with the processing logic wirelessly receiving a data packet from the load coil in response to circuitry of the rectifier circuit being powered on by current flowing through the load coil, as inducted by the intermediate coil, and to processing of the interrogation signal (2040).

With additional reference to FIG. 20, the method 2000 may continue with the processing logic setting inductances of the source coil, the intermediate coil, and the load coil such that mutual inductances thereof cause the source coil, the intermediate coil, and the load coil to resonate at an identical frequency and maximize power transfer efficiency (2050). The method 2000 may continue with the processing logic setting capacitances of the first capacitor, the second capacitor, and a third capacitor, which is coupled in series to the load coil, such as to tune out self-inductances of the source coil, the intermediate coil, and the load coil (2060).

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present embodiments are to be determined by the broadest permissible interpretation of the following claims and their equivalents, and shall not be restricted or limited by the foregoing detailed description. While various embodiments have been described, it will be apparent to those of ordinary skill in the art that many more embodiments and implementations are possible within the scope of the above detailed description. Accordingly, the embodiments are not to be restricted except in light of the attached claims and their equivalents, now presented or presented in a subsequent application claiming priority to this application.

What is claimed is:

1. An inductive wireless power transfer apparatus comprising:
a source coil coupled to a power source such that current flows through the source coil when the source coil is excited by the power source;
a first capacitor coupled in series to the source coil;
an intermediate coil surrounding the source coil and positioned within an identical plane as the source coil;
a second capacitor coupled in series to the intermediate coil; and
wherein:
capacitances of the first capacitor and the second capacitor are set so that the source coil and the intermediate coil resonate at a first frequency;
the source coil is to inductively power the intermediate coil, which is to inductively power a load coil positioned a distance away from the intermediate coil;
to maximize a predicted power transfer efficiency between the source coil and the load coil by causing a coupling quality factor (F21) between the intermediate coil and the source coil to be equal to one ("1"); and
a length of a side of the source coil is between ten to twenty percent a length of a side of the intermediate coil, and a length of a side of the load coil is less than ten percent the length of the side of the intermediate coil.

2. The inductive wireless power transfer apparatus of claim 1, wherein inductances of the source coil, the intermediate coil, and the load coil are set so that mutual inductances thereof cause the source coil, the intermediate coil, and the load coil to resonate at the first frequency and maximize power transfer efficiency.

3. The inductive wireless power transfer apparatus of claim 1, wherein the load coil is square in shape and has a side ranging from about 10 μm to 1 mm in length.

4. The inductive wireless power transfer apparatus of claim 1, wherein the load coil is coupled in series to a third capacitor, and wherein capacitances of the first capacitor, the second capacitor, and the third capacitor are set so that the source coil, the intermediate coil, and the load coil resonant at the first frequency.

5. The inductive wireless power transfer apparatus of claim 1, wherein the first frequency is between about 2 GHz and 6 GHz.

6. The inductive wireless power transfer apparatus of claim 1, wherein the distance comprises between about five to about thirty times a largest distance between sides of the load coil.

7. The inductive wireless power transfer apparatus of claim 1, wherein the source coil comprises five turns.

8. A system comprising:
a power source;
a source coil coupled to the power source such that current flows through the source coil when the source coil is excited by the power source;
a first capacitor coupled in series to the source coil;
a first intermediate coil that is co-centrically surrounding the source coil and positioned within an identical plane as the source coil;
a second capacitor coupled in series to the first intermediate coil;
a load coil to be positioned a distance away from the source coil and to be inductively powered through the intermediate coil;
a third capacitor coupled in series to the load coil; and
wherein:
capacitances of the first capacitor, the second capacitor, and the third capacitor are set so that the source coil, the first intermediate coil, and the load coil resonate at a first frequency;
to maximize a predicted power transfer efficiency between the source coil and the load coil by causing a coupling quality factor (F21) between the first intermediate coil and the source coil to be equal to one ("1"); and
a length of a side of the source coil is between ten to twenty percent a length of a side of the first intermediate coil, and a length of a side of the load coil is less than ten percent the length of the side of the intermediate coil.

9. The system of claim 8, wherein inductances of the source coil, the first intermediate coil, and the load coil are set so that mutual inductances thereof cause the source coil, the first intermediate coil, and the load coil to resonate at an the first frequency, which is between about 2 GHz and 6 GHz, and to maximize power transfer efficiency.

10. The system of claim 8, wherein the distance comprises between about five to about thirty times a second distance between sides of the load coil that is across a midpoint of the source coil.

11. The system of claim 8, wherein the load coil is located in a second plane, further comprising:
a second intermediate coil surrounding the load coil and positioned within a third plane that is parallel to the second plane of the load coil, wherein the second intermediate coil is to be inductively powered by the first intermediate coil and to inductively power the load coil;
a fourth capacitor coupled in series to the second intermediate coil; and
wherein capacitances of the first capacitor, the second capacitor, the third capacitor, and the fourth capacitor are set so that the source coil, the first intermediate coil, the load coil, and the second intermediate coil resonate at the first frequency.

12. The system of claim 11, wherein the third plane is one of identical to the second plane or located a second distance away from the third plane, the second distance being less than ten times the length of the side of the load coil.

13. The system of claim 11, wherein the length of the side of the load coil is about one percent the length of the side of the first intermediate coil, and wherein a length of a side of the second intermediate coil is about fifteen percent or greater than the length of the side of the first intermediate coil.

14. The system of claim 11, wherein a width of the side of the source coil is less than ten percent the width of the side of the first intermediate coil, a width of the side of the load coil is less than one percent the width of the side of the first intermediate coil, and a width of a side of the second intermediate coil is less than thirty percent the width of the side of first intermediate coil.

15. The system of claim 11, wherein the distance is between about 100 to about 1000 times a largest distance between sides of the load coil with use of the second intermediate coil.

16. The system of claim 11, further comprising:
a third intermediate coil concentrically surrounding the second intermediate coil and positioned within the third plane;
a fifth capacitor coupled in series to the third intermediate coil; and
wherein capacitances of the first capacitor, the second capacitor, the third capacitor, the fourth capacitor, and the fifth capacitor are set so that the source coil, the first intermediate coil, the load coil, the second intermediate coil, and the third intermediate coil resonate at the first frequency.

17. The system of claim 8, wherein the source coil comprises five turns.

18. A method comprising:
concentrically positioning an intermediate coil around a source coil of a wireless hardware authenticator and within an identical plane as the source coil;
setting capacitances of a first capacitor coupled in series to the source coil and of a second capacitor coupled in series to the intermediate coil such that the source coil and the intermediate coil resonate at a first frequency;
sending current through the source coil with a power source to cause the source coil to inductively power the intermediate coil, which in turn is to inductively power a load coil positioned a distance away from the source coil, wherein the current includes an interrogation signal, and wherein the load coil is coupled to a rectifier circuit;
maximizing a predicted power transfer efficiency between the source coil and the load coil by causing a coupling quality factor ($F_{21}$) between the intermediate coil and the source coil to be equal to one ("1");
setting a length of a side of the source coil to be between ten and twenty percent a length of a side of the intermediate coil, and a length of a side of the load coil to be less than ten percent the length of the side of the intermediate coil; and
wirelessly receiving a data packet from the load coil in response to circuitry of the rectifier circuit being powered on by current flowing through the load coil and to processing of the interrogation signal.

19. The method of claim 18, further comprising setting inductances of the source coil, the intermediate coil, and the load coil such that mutual inductances thereof cause the source coil, the intermediate coil, and the load coil to resonate at the first frequency and maximize power transfer efficiency.

20. The method of claim 18, further comprising setting capacitances of the first capacitor, the second capacitor, and a third capacitor, which is coupled in series to the load coil, such that the source coil, the intermediate coil, and the load coil resonate at the first frequency.

21. The method of claim 20, wherein the intermediate coil is a first intermediate coil, the method further comprising:
positioning a second intermediate coil around the load coil and within a second plane in which is approximately positioned the load coil; and
setting capacitances of the first capacitor, the second capacitor, the third capacitor, and a fourth capacitor, which is coupled in series to the second intermediate coil, such that the source coil, the first intermediate coil, the load coil, and the second intermediate coil resonate at the first frequency.

22. The method of claim 21, further comprising:
concentrically positioning a third intermediate coil around the second intermediate coil within the second plane; and
setting capacitances of the first capacitor, the second capacitor, the third capacitor, the fourth capacitor, and a fifth capacitor, which is coupled in series to the third intermediate coil, such that the source coil, the first intermediate coil, the load coil, the second intermediate coil, and the third intermediate coil resonate at the first frequency.

* * * * *